(12) United States Patent
Dudding et al.

(10) Patent No.: US 11,565,563 B2
(45) Date of Patent: Jan. 31, 2023

(54) SUSPENSION TRAVEL CONTROL SYSTEM

(71) Applicant: HENDRICKSON USA, L.L.C., Schaumburg, IL (US)

(72) Inventors: Ashley Thomas Dudding, Yorkville, IL (US); Jerry Michael Lovett, Joliet, IL (US); Richard John Aumann, Bolingbrook, IL (US); Foster Kolbe Pyle, Oswego, IL (US); Matthew Edward Michael DiCianni, Willowbrook, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 17/053,068

(22) PCT Filed: May 6, 2019

(86) PCT No.: PCT/US2019/030947
§ 371 (c)(1),
(2) Date: Nov. 4, 2020

(87) PCT Pub. No.: WO2019/213665
PCT Pub. Date: Nov. 7, 2019

(65) Prior Publication Data
US 2021/0138860 A1    May 13, 2021

Related U.S. Application Data

(63) Continuation-in-part of application No. 15/972,006, filed on May 4, 2018, now abandoned.
(Continued)

(51) Int. Cl.
*B60G 17/00* (2006.01)
*B60G 11/02* (2006.01)
(Continued)

(52) U.S. Cl.
CPC ............. *B60G 17/00* (2013.01); *B60G 11/02* (2013.01); *B60G 2202/11* (2013.01); *B60G 2204/45* (2013.01); *B60G 2206/428* (2013.01)

(58) Field of Classification Search
CPC .. B60G 17/00; B60G 11/02; B60G 2206/428; B60G 2202/11; B60G 2204/45;
(Continued)

(56) References Cited

U.S. PATENT DOCUMENTS 3,843,153 A * 10/1974 Ryan .................... B62D 61/125
 280/754
5,785,345 A * 7/1998 Barias .................. B60G 11/465
 280/124.116

(Continued)

FOREIGN PATENT DOCUMENTS

| EP | 2821264 A1 * | 5/2018 | ............... B60G 9/00 |
| EP | 2821264 B1 * | 5/2018 | ............... B60G 9/00 |
| WO | WO-2021078793 A1 * | 4/2021 | ........... B60B 35/006 |

OTHER PUBLICATIONS

EP2821264B1, Device for Limiting the Hanging of a Rebounded Axle of a Vehicle and Vehicle Comprising Such Device, English translation received from espacenet on Oct. 7, 2021 (Year: 2018).*

*Primary Examiner* — Paul N Dickson
*Assistant Examiner* — Caitlin Anne Miller
(74) *Attorney, Agent, or Firm* — Cook Alex Ltd.

(57) ABSTRACT

A suspension travel control system (1046) for a vehicle suspension is disclosed. The suspension travel control system includes a stop post (834) secured to the vehicle frame and a suspension travel control formation that includes a base (1042) and a body (1048). The stop post (834) is positioned in a space defined by the body (1048). The suspension travel control formation may be secured to the axle, the main support member or incorporated into the axle coupling assembly to provide a rebound and jounce stop as (Continued)

well as longitudinal redundancy in the event of the failure or loss of a longitudinal linkage.

32 Claims, 21 Drawing Sheets

Related U.S. Application Data

(60) Provisional application No. 62/820,103, filed on Mar. 18, 2019.

(58) Field of Classification Search
CPC .............. B60G 9/003; B60G 11/465; B60G 2204/4504; B60G 2202/112; B60G 2204/4306; B60G 2200/31
USPC ....................................... 280/124
See application file for complete search history.

(56) References Cited

U.S. PATENT DOCUMENTS

| | | | | |
|---|---|---|---|---|
| 6,279,950 | B1 * | 8/2001 | Armstrong | B60G 5/00 |
| | | | | 280/754 |
| 6,709,014 | B2 * | 3/2004 | Svartz | B60G 11/27 |
| | | | | 280/124.116 |
| 9,085,212 | B2 * | 7/2015 | Dudding | B60G 11/27 |
| 2005/0051933 | A1 * | 3/2005 | Platner | B60G 11/465 |
| | | | | 267/38 |
| 2007/0108711 | A1 * | 5/2007 | Smith | B62D 61/125 |
| | | | | 280/86.5 |
| 2011/0227308 | A1 * | 9/2011 | Aalderink | B60G 9/003 |
| | | | | 29/428 |

* cited by examiner

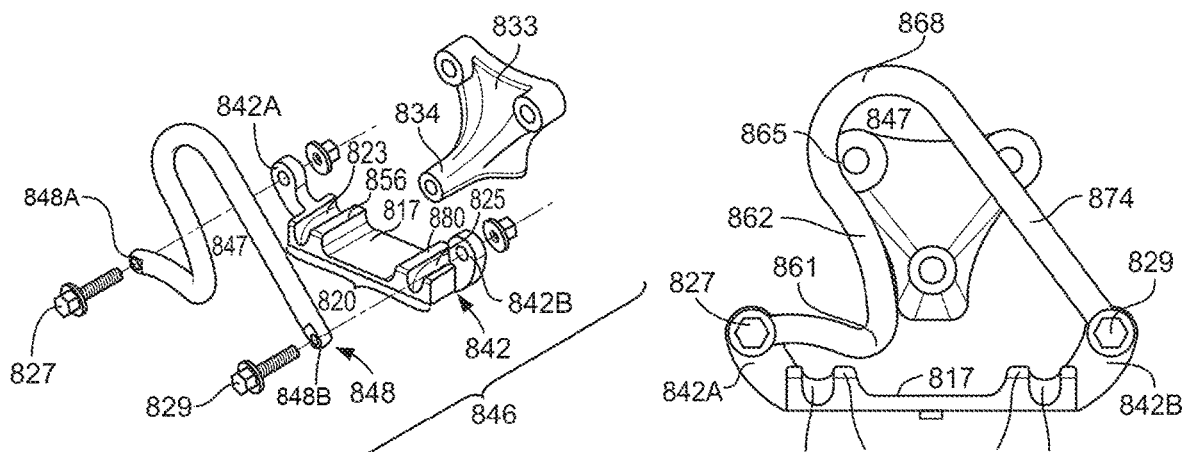
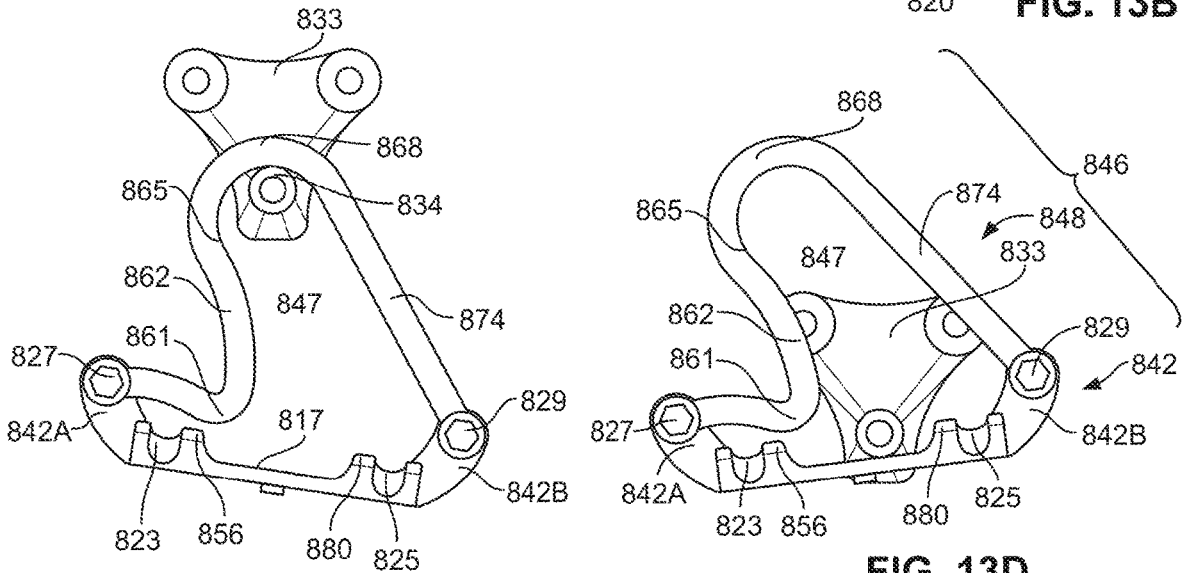
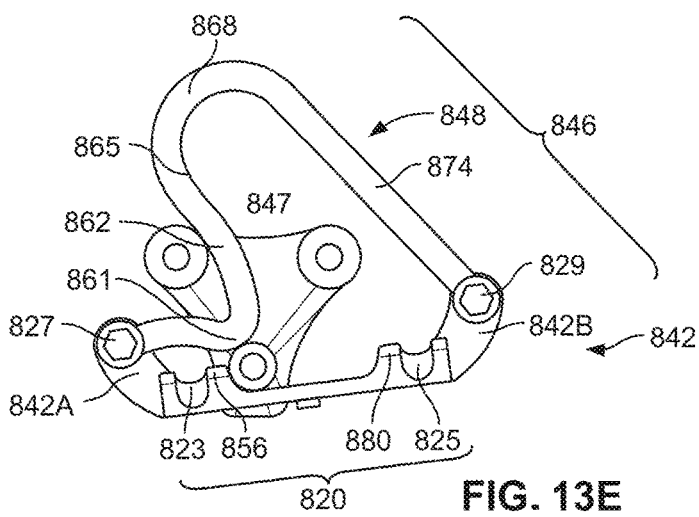

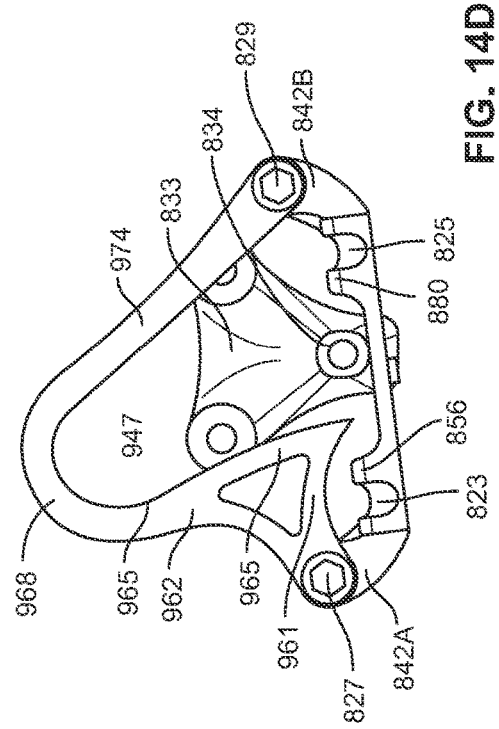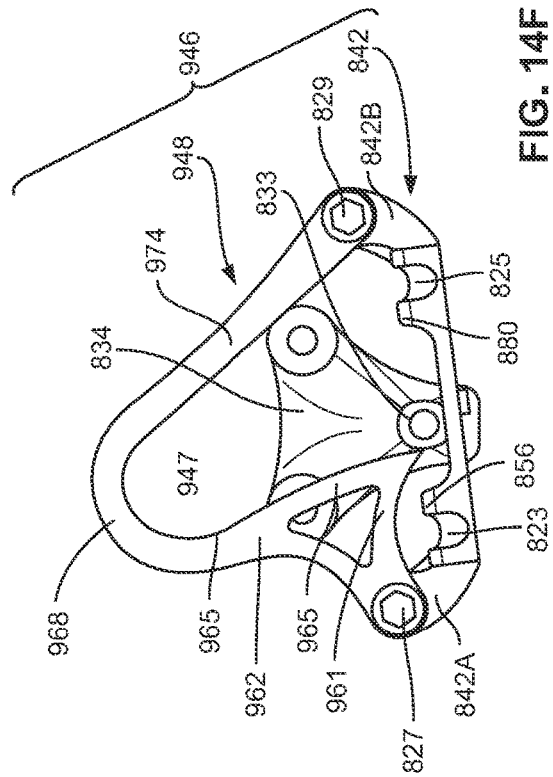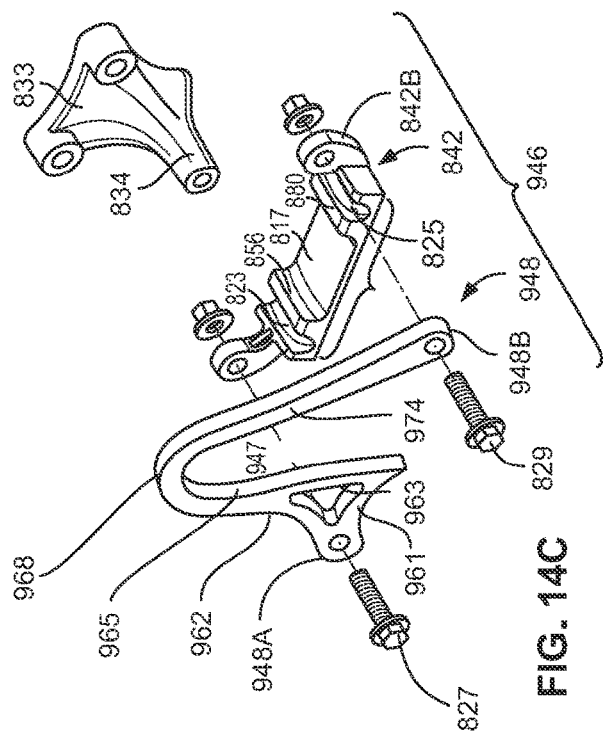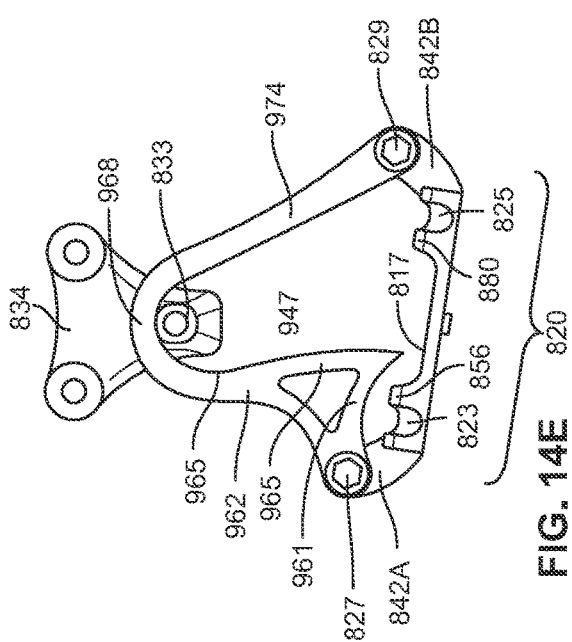

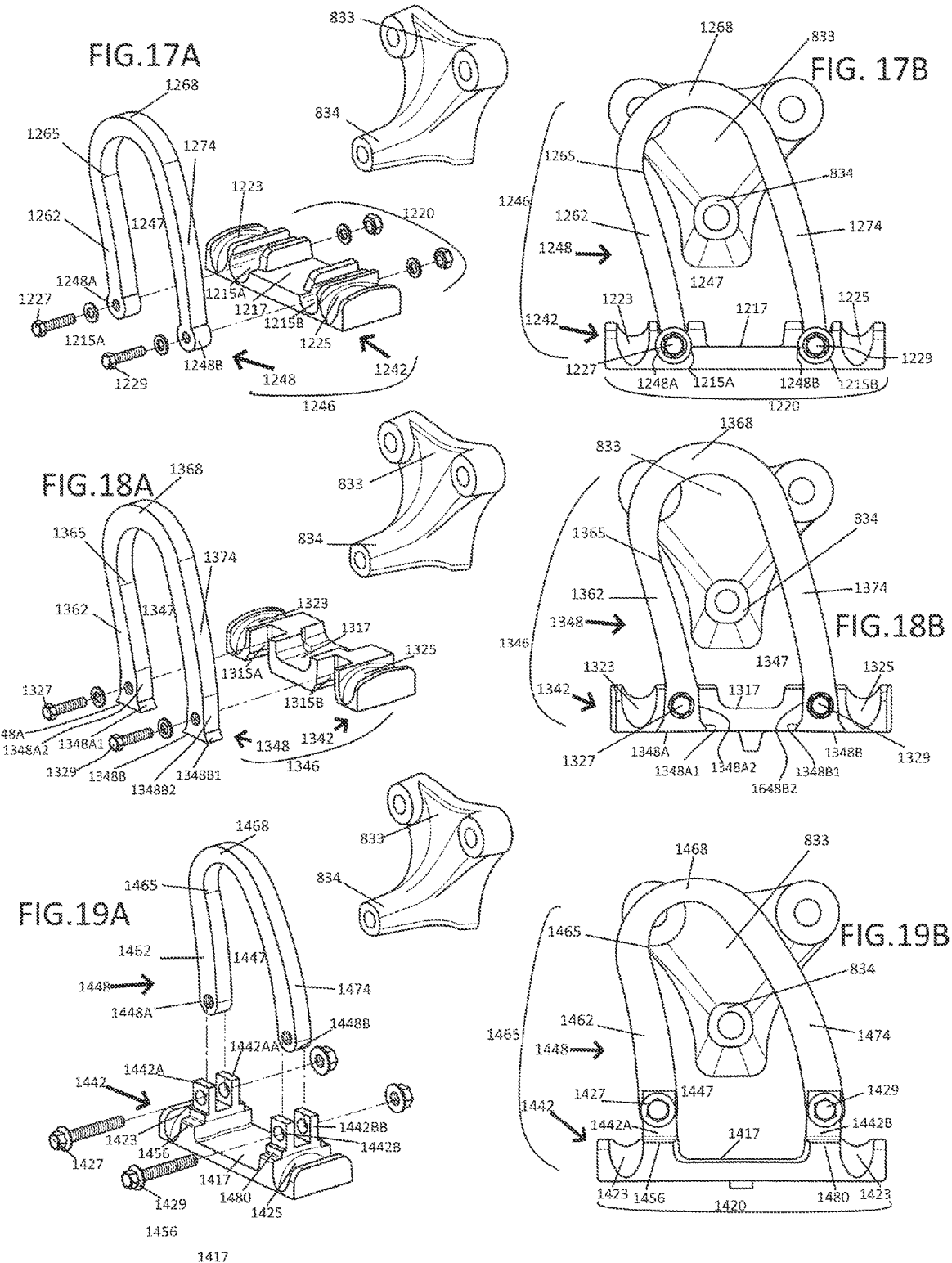

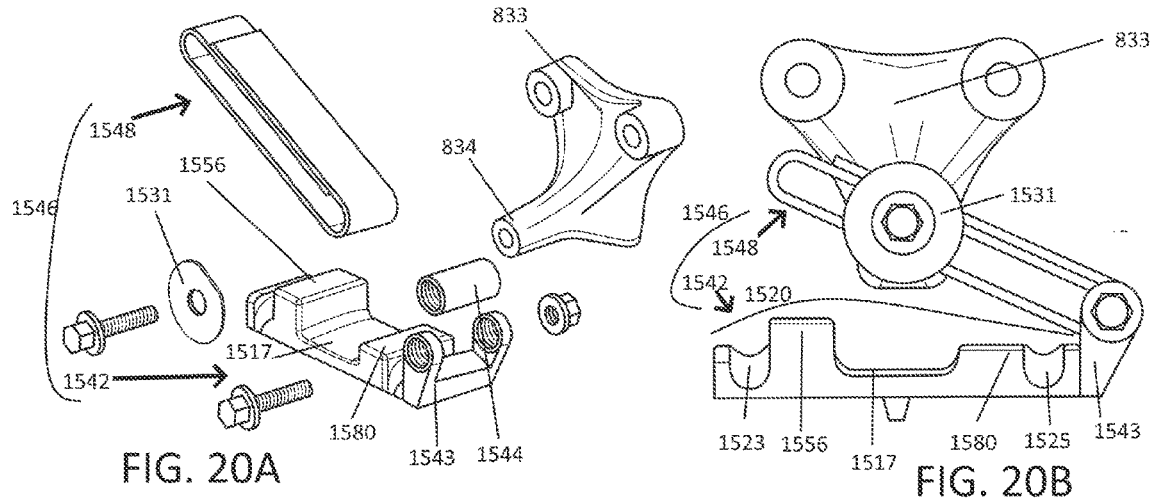
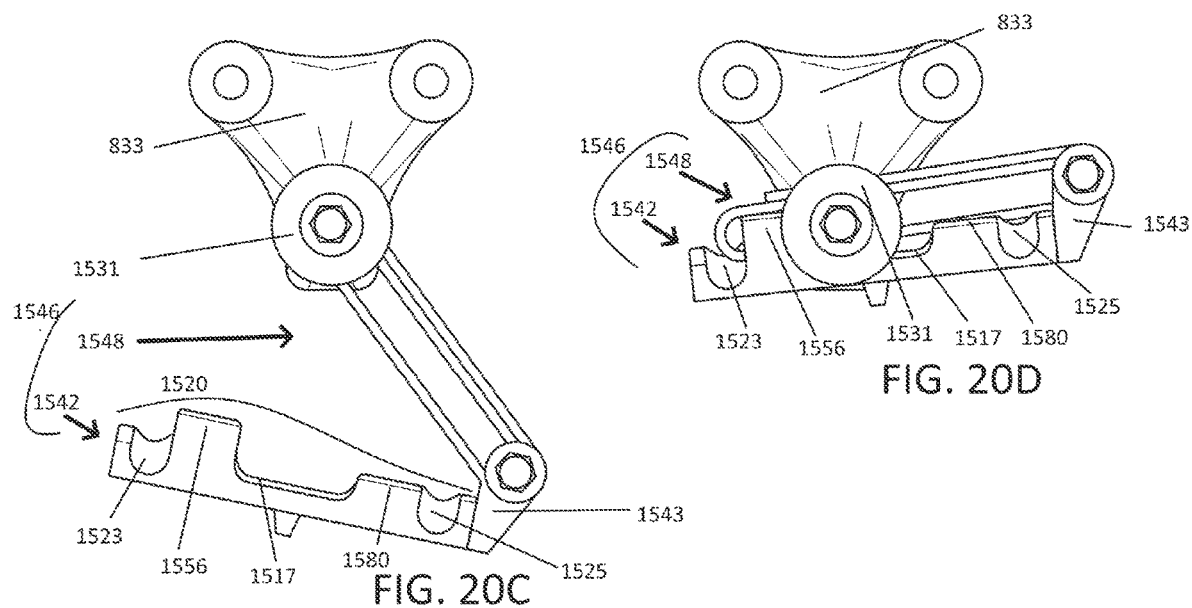
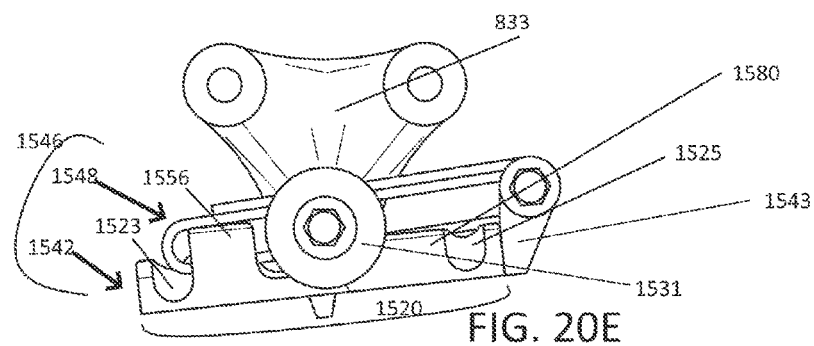

SUSPENSION TRAVEL CONTROL SYSTEM

CROSS-REFERENCE TO RELATED APPLICATIONS

The present application is a U.S. national stage application of International Patent Application No. PCT/US2019/030947, filed May 6, 2019, which claims the benefit of and priority of U.S. Non-Provisional patent application Ser. No. 15/972,006, filed May 4, 2018, now abandoned, and U.S. Provisional Patent Application Ser. No. 62/820,103, filed Mar. 18, 2019, the contents of all of which are hereby incorporated by reference in their entireties

BACKGROUND OF THE INVENTION

Field of the Disclosure

The present subject matter relates to heavy-duty axle/suspension systems and specifically to suspension travel control systems. More particularly, the present disclosure is directed to a suspension travel control systems for heavy-duty axle/suspension systems which is low cost, easy to manufacture, customizable and available for use in original equipment design and manufacturing as well as aftermarket and retrofit applications, thus making it useful on a variety of axle/suspension systems, and further, which eliminates or reduces the need for other suspension components that control or limit suspension travel, thus reducing the unsprung weight of the suspension system.

A heavy-duty vehicle such as a vehicle cab, semi-trailer or trailer typically is equipped with at least one and usually more than one axle/suspension system. The axle/suspension systems are suspended from the vehicle frame and will typically include an axle connected or secured to a suspension linkage which positions and restrains movement of the axle in a longitudinal and/or vertical direction, such as for example, a leaf spring; a leading arm or trailing arm in the form of rigid beam or beam spring or main support member; or a control arm. The suspension linkage is movably connected to the vehicle frame, such as for example, when one end of the linkage is pivotally connected to the vehicle frame with the use of a bushing, pivot bolt and bracket. In this example, another end of the linkage is typically attached to the vehicle frame via an air spring. A shock absorber may also be attached to and extend between the linkage and the vehicle frame.

During normal operation of the vehicle, the wheels attached to the axle encounter bumps and depressions in the road over which the vehicle is traveling forcing the linkage and the axle to move up and down, or in the particular example referred to above pivot about an axis of rotation defining an arc of travel. Various components of the axle/suspension system, and in particular the linkage bushing assemblies, the air springs and the shock absorbers, all cooperate in reacting the loads encountered by the vehicle wheels. The suspension system serves to cushion the vehicle frame and ultimately minimizes undue wear and damage to the frame and any cargo being transported, and also makes the ride comfortable for passengers.

During maximum downward travel or full rebound of the suspension system, a positive rebound stop is required to prevent damage that would otherwise occur to suspension componentry, such as the air springs (if present), and in severe cases, to the linkage and other suspension components. Shock absorbers can provide this positive stop during suspension rebound. They also function as hydraulic dampers for the air springs. However, reliance on a shock absorber to fulfill the rebound stop requirement significantly shortens the life of the shock absorber. Moreover, the cost and weight of alternative rebound stop technologies, such as those that use chains and the like, are not insubstantial and approach that of hydraulic shock absorbers.

Improvements in air spring technologies eliminate the reliance on hydraulic dampers. However, the full benefit and advantages of these technologies, including but not limited to the potential for reducing the overall cost and weight of suspension systems in which they are incorporated, are not realized with the use of existing suspension travel control technologies.

Limiting suspension system travel in the longitudinal direction and providing redundancy for longitudinal control, such as for example, in the event of the loss of a linkage, is also desired.

The present disclosure addresses the needs and/or shortcomings of prior art suspension systems

SUMMARY OF THE INVENTION

There are several aspects of the present subject matter which may be embodied separately or together in the devices and systems described and claimed herein. These aspects may be employed alone or in combination with other aspects of the subject matter, and the description of these aspects together is not intended to preclude the use of these aspects separately or the claiming of such aspects separately as set forth in the claims appended hereto.

In one aspect of this disclosure, a suspension system for a vehicle is disclosed that includes a vehicle frame, an axle, a suspension linkage that is longitudinally disposed and movably connected to the vehicle frame, and a suspension travel control system. The suspension travel control system includes a stop post that is secured at one end to the vehicle frame and that presents at least one contact surface, and body and a base. The body has an interior surface defining an interior space. The axle, the suspension linkage and the suspension travel control formation are coupled by an axle coupling assembly in a manner that permits the axle, the suspension linkage and the suspension travel control formation to move at least in part in a vertical direction. The stop post is positioned in the interior space for the engagement of the at least one contact surface of the stop post with the interior surface of the body of the suspension travel control formation to limit downward travel of the axle or the suspension linkage.

In another aspect of this disclosure, a suspension system for a vehicle is disclosed that includes a vehicle frame, an axle, a suspension linkage, and a suspension travel control system. The suspension linkage has a first end portion and is movably connected to the vehicle frame at the first end portion to permit the suspension linkage to move at least in part in a vertical direction. The suspension travel control system includes a stop post and a suspension travel control formation. The stop post is secured at one end to the vehicle frame and that presents a first contact. The suspension travel control formation includes a body and a base and presents an interior surface defining an interior space. The axle, the suspension linkage, and the suspension travel control formation are fixed in relation to one another by one or more fasteners and undergo generally vertical movement between a first position or jounce position, and a second position or rebound position. The stop post is positioned in the interior space for the engagement of the first contact surface with a first portion of the interior surface of the suspension travel control formation to limit travel of the axle or the suspension linkage in a first direction that is not parallel to the generally vertical movement of the axle.

In yet another aspect of this disclosure, a suspension system for a vehicle is disclosed that includes a vehicle frame, an axle, a suspension linkage that is longitudinally disposed and movably connected to the vehicle frame, and a suspension travel control system. The suspension travel control system includes a stop post and a suspension travel control formation. The stop post is secured at one end to the vehicle frame and presents a first surface and a second surface. The suspension travel control formation has a body and a base and presents a first contact surface and a second contact surface, which are spaced apart from one another and on opposite sides of the stop post. The axle, the suspension linkage and the suspension travel control formation are fixed in relation to one another by one or more fasteners. The suspension travel control formation and stop post are configured to move relative to one another and in accordance with the movement of the suspension system during operation. The first surface of the stop post and the first contact surface of the suspension travel control formation are positioned for engagement with one another to limit movement of the suspension system in a first direction, and the second surface of the stop post and the second contact surface of the suspension travel control formation are positioned for engagement with one another to limit movement of the suspension system in a second direction, and the first direction and the second direction are generally opposite one another.

In yet another aspect of this disclosure, a suspension system for a vehicle is disclosed that includes a vehicle frame, an axle, a suspension linkage that is longitudinally disposed and movably connected to the vehicle frame, and a suspension travel control system. The suspension travel control system includes a stop post that is secured at one end to the vehicle frame and presents at least one contact surface. The suspension travel control formation has a body and a base. The body includes a link having an interior surface that defines an elongated interior space. The axle, the suspension linkage and the suspension travel control formation are fixed in relation to one another and undergo generally vertical movement during operation of the suspension system. The stop post is positioned in the interior space for the engagement of the at least one contact surface of the stop post with the interior surface of the body of the suspension travel control formation to limit downward travel of the axle or the suspension linkage during operation of the suspension system.

BRIEF DESCRIPTION OF THE DRAWINGS

In describing the preferred examples, reference is made to the accompanying drawing figures.

FIG. 13A is an exploded, upper perspective view of a suspension travel control system according to an eighth embodiment of the present disclosure.

FIG. 13B is a non-exploded, elevational view of the embodiment shown in FIG. 13 A in a neutral state.

FIG. 13C is a elevational view of the embodiment shown in FIG. 13B in rebound position.

FIG. 13D is a elevational view of the embodiment shown in FIG. 13B in jounce position.

FIG. 13E is a elevational view of the embodiment shown in FIG. 13B in a state wherein the suspension system has experienced a loss or failure of the main support member.

FIG. 14C is an exploded, upper perspective view of the suspension travel control formation of the embodiment shown in FIG. 14A.

FIG. 14D is a non-exploded, side, elevational view of the suspension travel control formation of the embodiment shown in FIGS. 14A and 14B in jounce position.

FIG. 14E is a side, elevational view of the suspension travel control system of the embodiment shown in FIG. 14D in rebound position.

FIG. 14F is a side, elevational view of the suspension travel control formation of the embodiment shown in FIG. 14D in a state wherein the suspension system has experienced a loss or failure of the main support member.

FIG. 17A is an exploded, upper perspective view of a suspension travel control system according to a twelfth embodiment of the present disclosure.

FIG. 17B is a non-exploded, elevational view of the embodiment shown in FIG. 17A in a neutral state.

FIG. 18A is an exploded, upper perspective view of a suspension travel control system according to a thirteenth embodiment of the present disclosure.

FIG. 18B is a non-exploded, elevational view of the embodiment shown in FIG. 18A in a neutral state.

FIG. 19A is an exploded, upper perspective view of a suspension travel control system according to a fourteenth embodiment of the present disclosure.

FIG. 19B is a non-exploded, elevational view of the embodiment shown in FIG. 19A in a neutral state.

FIG. 20A is an exploded, upper perspective view of a suspension travel control system according to fifteenth embodiment of the present disclosure.

FIG. 20B is a non-exploded, elevational view of the embodiment shown in FIG. 20A in a neutral state.

FIG. 20C is a non-exploded, elevational view of the embodiment shown in FIG. 20A in a rebound state.

FIG. 20D is an elevational view of the embodiment shown in FIG. 20A in a state wherein the suspension system has experienced a loss or failure of the main support member.

FIG. 20E is a non-exploded, elevational view of the embodiment shown in FIG. 20A in a jounce state.

DETAILED DESCRIPTION

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 4A:
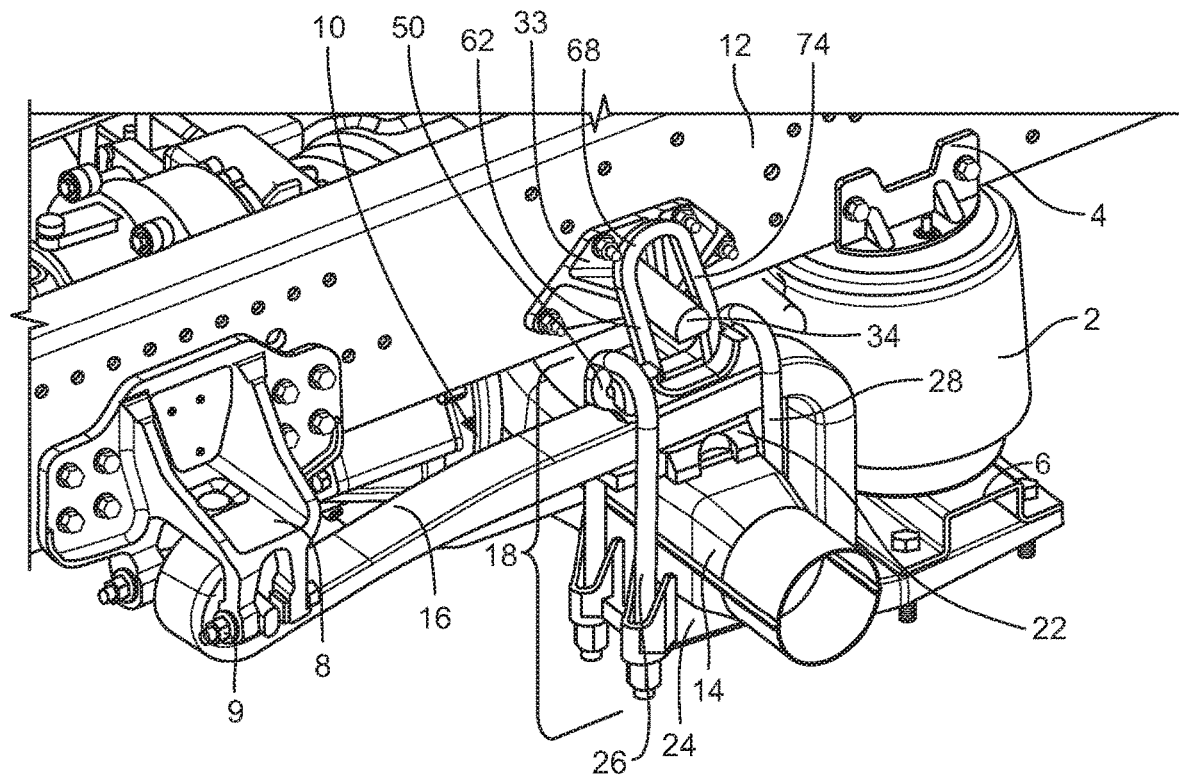
FIG. 4A is a front left side perspective view of a vehicle suspension system without wheel ends incorporating the suspension travel control system of FIGS. 1A-2C in a neutral state.
Figure 4B:
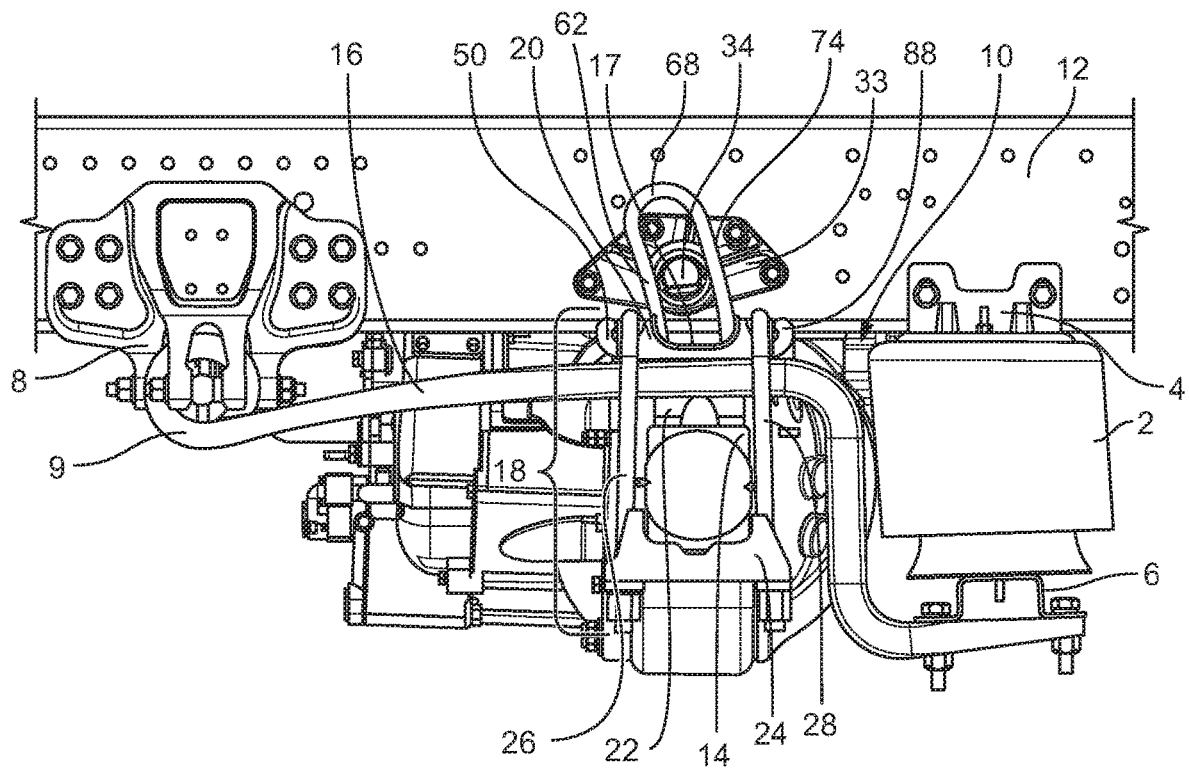
FIG. 4B is a side elevational view of the subject matter shown in FIG. 4A.

A suspension system incorporating a first example suspension travel control system of the present disclosure is indicated in general at 10 (FIGS. 4A & 4B). FIGS. 4A and 4B has the wheel ends and brakes removed to more clearly see the components that will be referred to or discussed herein. Turning to FIGS. 4A and 4B, a suspension system 10 is illustrated for coupling a longitudinally extending frame member 12 on one side of a vehicle chassis to a laterally extending axle 14 that is disposed below the frame member 12. As with the other drawings in this disclosure, it will be appreciated that the figures show a system for one side of a wheeled vehicle or trailer and a similar system would be provided on the opposite side to form a full suspension system.

The first example suspension system 10 includes at least one longitudinally oriented, suspension linkage, which in this example is in the form of a generally Z-shaped or gooseneck leaf spring also referred to as a main support member 16, It will be appreciated that the longitudinally oriented, suspension linkage may be any suitable, elongated single leaf spring, multileaf spring, beam spring, leading/trailing arm, rigid suspension beam, control arm or other elongated spring or beam element that is secured or connected, directly or indirectly, such as via a bushing assembly, to the vehicle frame or subframe or hanger bracket, at one end or end portion of the suspension linkage and at another end or end portion of the suspension linkage is secured or connected, directly or indirectly, such as via an air spring or bushing assembly, to the vehicle frame or subframe, or hanger bracket.

The suspension linkage, which is a main support member 16 in the first example suspension system shown in FIG. 4A, extends over the axle 14 in an overslung arrangement. In other suspension systems, the suspension linkage may extend over, under, through or around the axle, without departing from the scope of the present disclosure. The axle 14 is connected to the main support member 16 through the use of an axle coupling assembly, which in this example, rigidly secures the axle 14 to the suspension linkage 16 in the manner discussed below. The main support member 16 also is movably connected to the vehicle frame to permit the suspension linkage 16 and axle 14 to move up and down with the suspension system during use. In this example, the main support member 16 has a first end that includes a cylindrical eye portion 9 pivotally connected to the frame hanger bracket 8 with materials and techniques known to those skilled in the art, which may include for example, the use of a bushing and pivot bolt as appropriate. In this example, the axle 14 and the main support member 16 pivot about a rotational axis. During normal use, the travel path or movement of the axle 14 and the main support member 16 generally follows an arc defined in substantial part by the main support member's pivotal connection to the vehicle frame via bracket 8.

An air spring 2 is attached at its upper side to an air spring bracket 4 mounted to the frame member 12. At its lower side, air spring 2 is seated on a cross channel 6 positioned on the distal end of the main support member 16. A shock absorber (not shown) also may be included and be pivotally connected at its upper end to a bracket mounted on the vehicle frame member 12 and attached at its bottom end to a lower shock bracket positioned on the trailing end of the main support member 16. Although the suspension system incorporating the first example suspension travel control system, as illustrated in FIGS. 4A and 4B, employs an air spring, it is not limited to such a configuration, and may be deployed with other suspension types, such for example, the suspension type illustrated in U.S. Pat. No. 9,050,873 which employs a straight monoleaf spring design with shock absorber, with and without an air spring, as well as other suspension types referred to or disclosed herein without departing from the scope of the present disclosure.

As shown in FIGS. 4A and 4B, an axle coupling assembly 18 operatively couples the axle 14 to the main support member 16. From the top downward beginning with the top mounting pad, the axle coupling assembly 18 includes a top mounting pad or first mounting pad 20, also known as a first guide plate or clamp plate; a suspension travel control formation 46 which will be discussed in further detail below, an optional caster wedge 22 disposed between the main support member 16 and the axle 14; and a bottom mounting paid or second mounting pad 24, also known as a second guide plate or clamp plate. A pair of U-shaped fastener assemblies 26,28, which in the first example embodiment are shown as first and second U bolts and connectors are used to clamp together the aforementioned components in fixed relation to another.

Figure 4C:
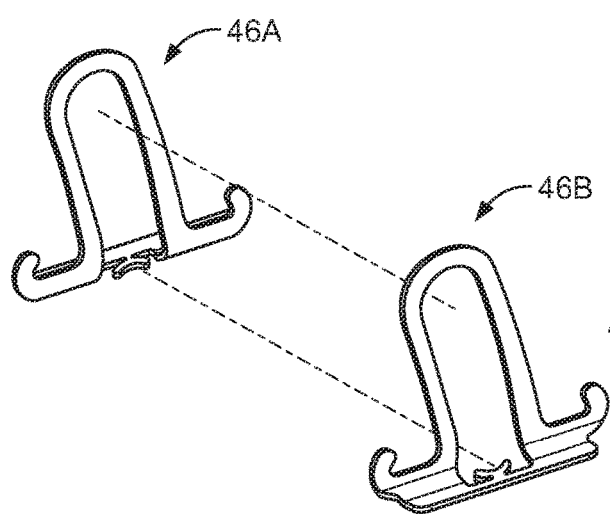
FIG. 4C is an exploded, upper perspective view that includes the component shown in FIGS. 4A-4B and its mirror image component.
Figure 4D:
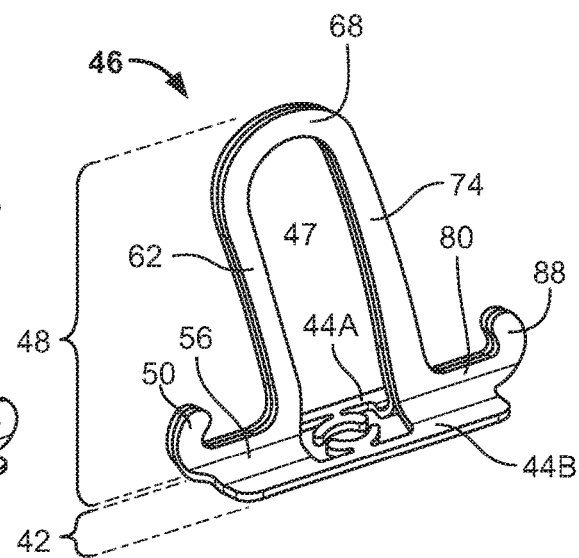
FIG. 4D is a non-exploded, upper perspective view of a suspension travel control formation of the embodiment shown in FIGS. 1A-4B.

The suspension travel control system includes the suspension travel control formation 46 referred to above and a stop member or stop post 34, which is discussed later herein. The suspension travel control formation 46 has a body 48 and a base 42. The body 48 provides an interior surface defining an interior space 47. The base 42 extends in the longitudinal, lateral and vertical directions and supports the body 48, as further discussed herein. The first example suspension travel control formation may be integrally formed in one piece construction, or provided as an assembly, such as, for example, as shown in FIGS. 4C, 4D, and 4G in which mirror image, inboard and outboard elements 46A, 46B interface along a centrally positioned, longitudinal, vertical plane and are then secured together by suitable means, such as, for example, by welding.

In this first example embodiment, the body 48 of the suspension travel control formation 46 is a rigid structure and includes a first frame member or first portion 62, a second frame member or second portion 68, and a third frame member or third portion 74 (FIG. 4D), which together provide an interior surface defining an elongated interior space or slot 47. Each of the first, second and third frame members 62,68,74 have a first longitudinal end portion and a second longitudinal end portion. The first frame member 62 and third frame member 74 are spaced apart and extend generally vertically from a first longitudinal end portion that is connected to or transitions from a separate shoulder portion 56, 80 of the base 42. The shape and the orientation of the first frame member and the third frame member follow a path that is generally consistent with or generally parallel to the path or direction of travel of the axle 14 and the main support member 16 and during normal or ordinary operating conditions. In this first example, this path generally follows an arc, the shape and orientation of which may be determined in substantial part by its radius, or distance to the axis of rotation, which in the first example, is generally perpendicular to and extends through the eye of the main support member. The spacing between the first frame member and the third frame member are sufficient to accommodate flexing of the main support member and other suspension compliance features that alter or vary this distance during normal or ordinary use. The second longitudinal end portions of the first frame member 62 and third frame member 74 connect or transition into respectively, the first and second longitudinal end portions of the second frame member 68 located at the top end portion of the elongated space 47. In this example, the second frame member of the suspension travel control formation is C or U shaped but may be varied without departing from the scope of the present disclosure.

A stop member which in the first example is a stop post 34 is positioned in the interior space 47 of the body 48 of the suspension travel control formation 46 in a manner that permits the stop post and body to move in relation to one another during use. The stop post 34 has a first end portion and a second end portion, an exterior surface which in the first example extends in the axial and radial directions, and a central axis that is generally transverse to the orientation of the body 48 of the suspension travel control formation 46. The stop post 34 is secured at its first end to the vehicle frame member 12 by bracket 33 (FIG. 4A). Alternatively, the first end of the stop post 34 may extend into and through the vehicle frame member 12 and be secured by a bracket positioned on the inboard side of the vehicle frame. The stop post 34 presents a contact surface at different locations of its exterior surface, including on the top exterior surface 38 facing the interior surface of the second frame member 68 of the body, on the bottom exterior surface 36 facing the top surface of the mounting pad 20, and on the exterior surfaces fore and aft (35 and 37) facing the interior surfaces of the respective first and third frame members 62, 74. Each stop surface or contact surface of the stop post 34 is positioned and configured for engagement with a corresponding interior surface of the first frame member 62, second frame member 68 or third frame member 74 or top mounting pad 20 to control and/or to limit travel of the suspension in a given direction as further discussed herein.

Figure 3A:
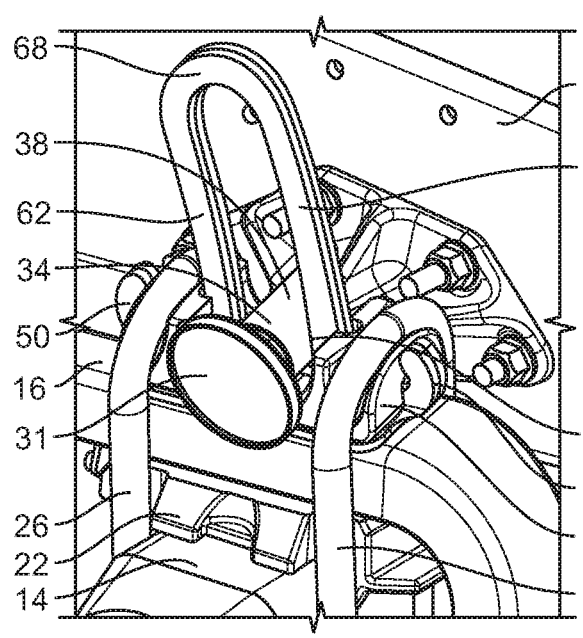
FIG. 3A is upper rear perspective view of the subject matter of FIG. 1A-2C with a further modification of the present disclosure.
Figure 3B:
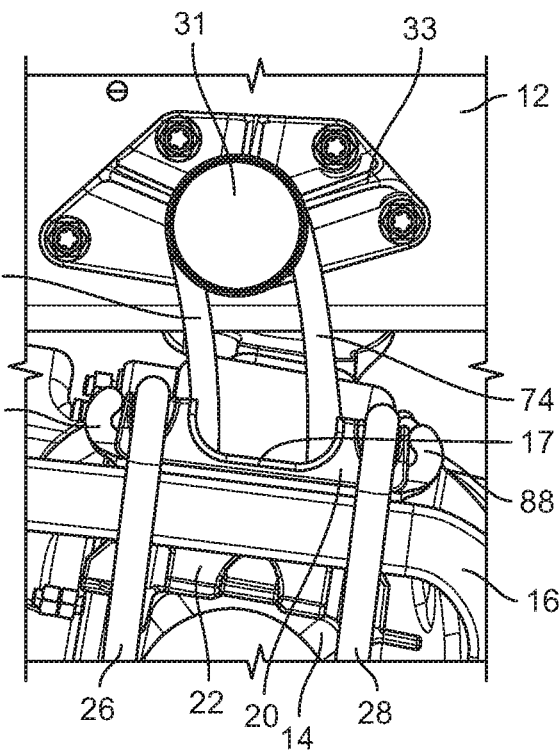
FIG. 3B is a side elevational view of the subject matter of FIG. 3A.
Figure 3C:
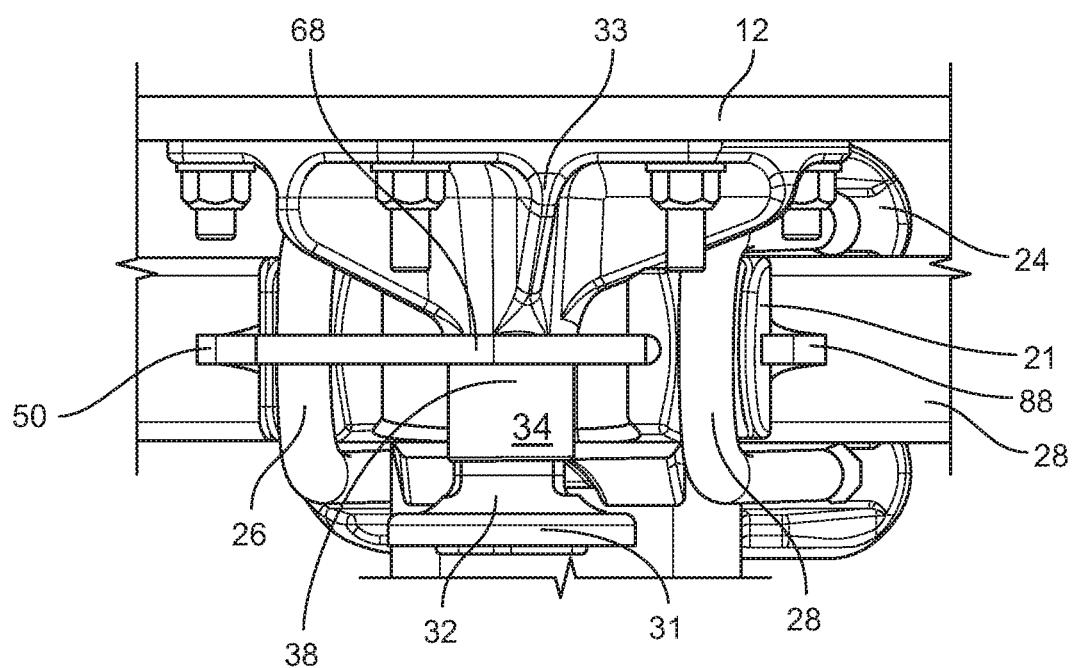
FIG. 3C is a top plan view of the embodiment shown in FIGS. 3A-3B.

An optional flange 31 presenting an inboard facing surface 32 can be connected to the second end portion of the stop post 34 to provide a barrier against excessive lateral movement that would laterally separate the body 48 of the suspension travel control formation 46 from the stop post 34 thereby exiting the stop post from the interior space 47 of the body 48 of the suspension travel control formation 46 (FIGS. 3A-3C). In position, the span of the flange will preferably exceed the distance by which the first frame member 62 and third frame member 74 of the body 48 are separated. While the shape of the example flange 31 in FIGS. 3A-3B is generally circular, it may be varied without departing from the scope of the present disclosure. The flange 31 may be secured at the second end portion of the stop post 34 by either internal or external threads that are received within respectively, complementary external or internal threading in the centered hub of the flange or by other fastening techniques and materials known to those skilled in the art.

The base 42 of the suspension travel control formation 46 is provided in the first example embodiment by the opposing, outwardly extending, inboard and outboard flanges 44A, 44B (FIG. 4D) which turn upward to converge or interface along a centrally positioned, longitudinal, vertical plane, to provide spaced apart, vertically and longitudinally oriented, first and second shoulder portions 56,80, each having an interior end portion or proximal end portion and an exterior end or distal end portion. The vertically oriented, shoulder portions 56,80 positioned outside the first longitudinal end portions of the first frame member 62 and third frame member 74 reinforces the strength of the suspension travel control formation. The distal end portion of each shoulder portion 56, 58 is further extended by its connection or transition to an upwardly extending, longitudinally oriented flange 50,88, an end portion of which is configured to contact a corresponding end face 19,21 of the top mounting pad 20. This feature assists in securing the suspension travel control formation 46 in place and in more evenly distributing operational loads and stresses throughout the suspension travel control formation 46 and top mounting pad 20.

Figure 1A:
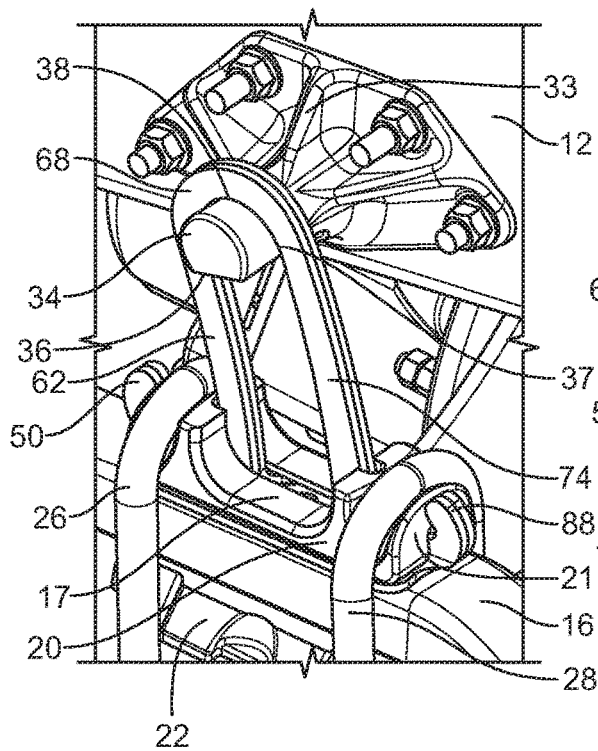
FIG. 1A is upper rear perspective view of a portion of a vehicle suspension system incorporating a suspension travel control system in rebound position according to a first embodiment of the present disclosure.
Figure 1B:
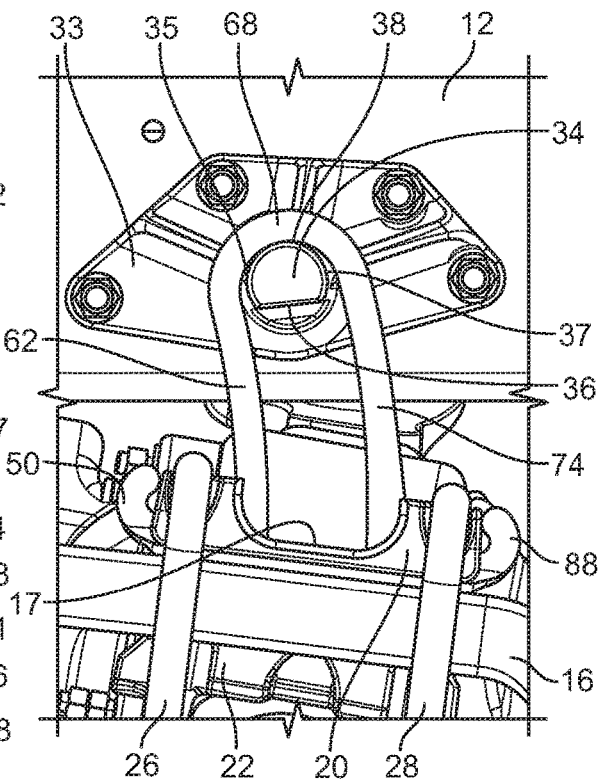
FIG. 1B is a side elevational view of the subject matter of FIG. 1A.
Figure 1C:
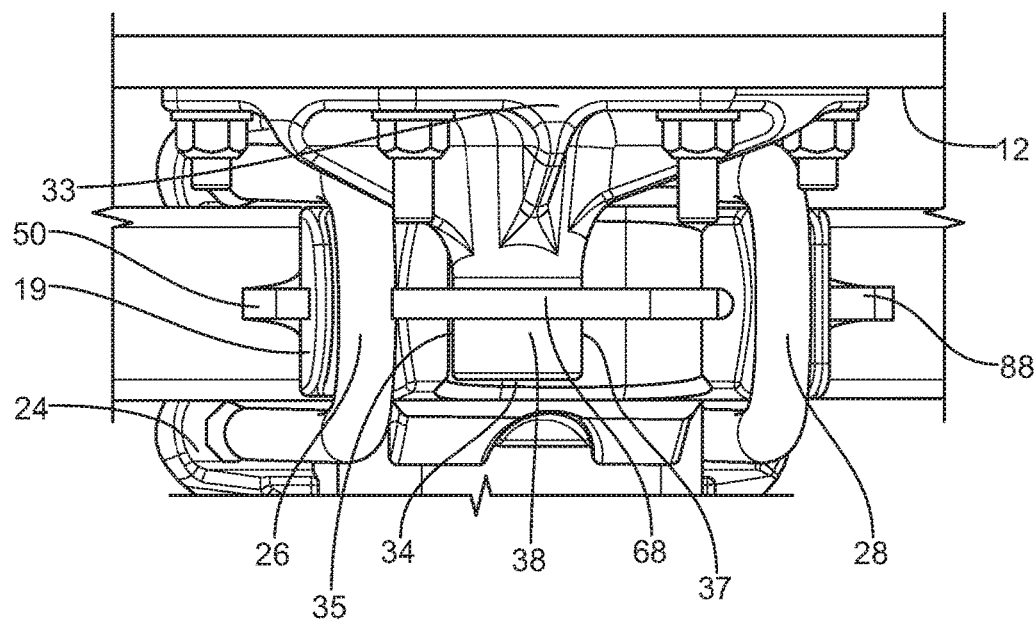
FIG. 1C is a top plan view of the embodiment shown in FIGS. 1A-1B.
Figure 2A:
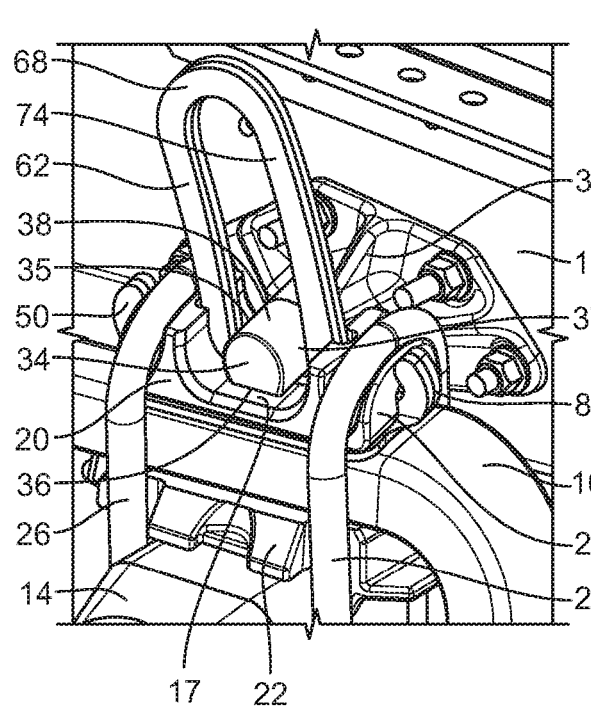
FIG. 2A is upper rear perspective view of a portion of a vehicle suspension system incorporating a suspension travel control system in jounce position according to a first embodiment of the present disclosure.
Figure 2B:
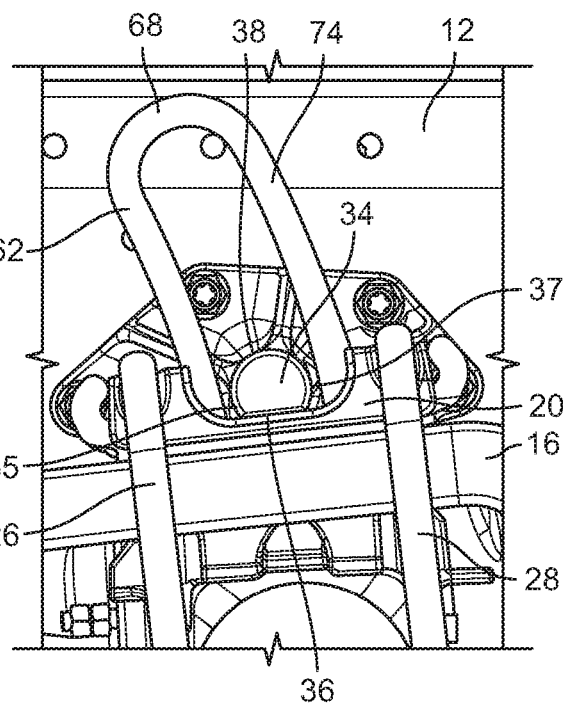
FIG. 2B is a side elevational view of the subject matter of FIG. 2A.
Figure 2C:
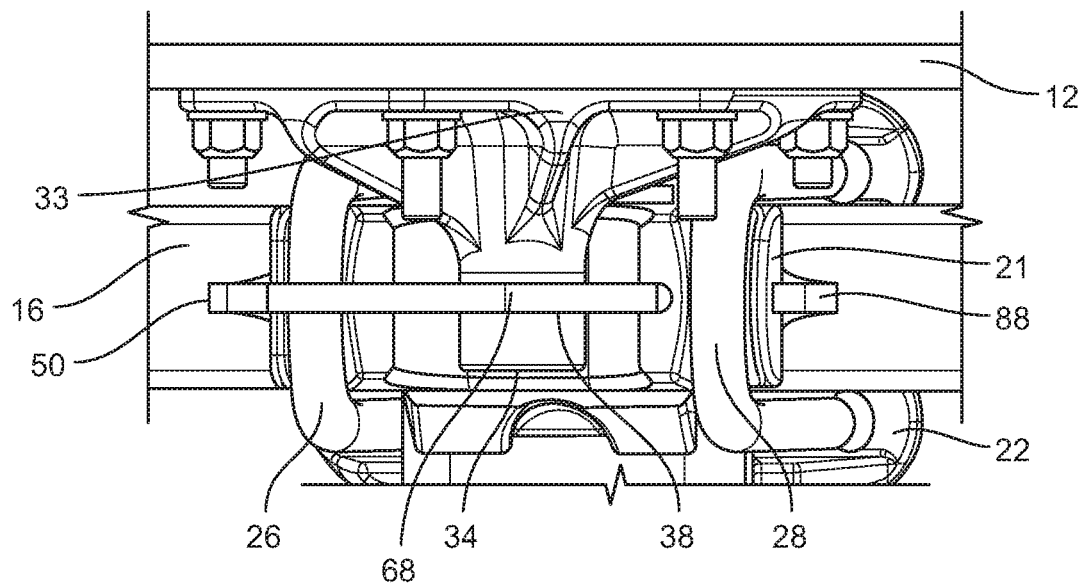
FIG. 2C is a top plan view of the embodiment shown in FIGS. 2A-2B.

The top surface of the top mounting pad 20 has fastener engagement surfaces 23,25 which in this first example embodiment, are two upwardly facing grooved surfaces, each designed to receive a bight portion of a U shaped fastener 26,28. The top surface of the top mounting pad 20 between the fastener engagement surfaces 23,25 provides a contact surface 17 in the form of a depression or recess, which during vehicle operation, is intermittently brought into contact with a stop surface or contact surface 36 positioned on the bottom exterior surface of the stop post 34 to limit upward jounce travel or other lifting of the main support member, the axle and/or the suspension system (FIGS. 2A-2C) relative to the vehicle frame. In the example shown in FIGS. 2A-2C, this contact surface 36 of stop post 34 is represented by the flattened portion on the bottom exterior surface of the stop post 34, but may be differently configured without departing from the scope of the present disclosure. The creation of the recess that presents the contact surface 17 on the top surface of the top mounting pad 20 reduces its weight and also permits a greater range of travel of the main support member 16 to the jounce position within the packaging constraints of the suspension system.

Figure 4E:
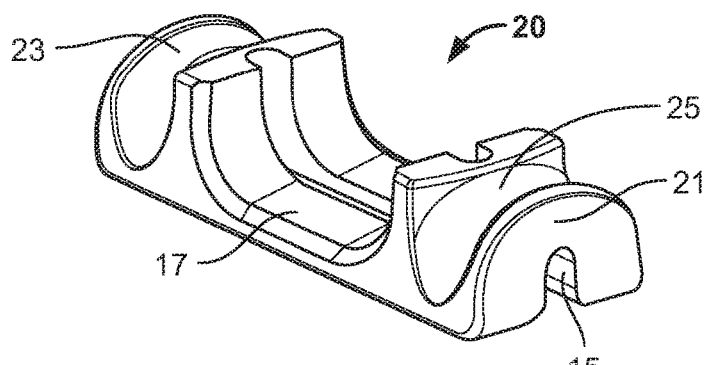
FIG. 4E is an upper perspective of the top mounting pad of the embodiment shown in FIGS. 1A-4B.
Figure 4F:
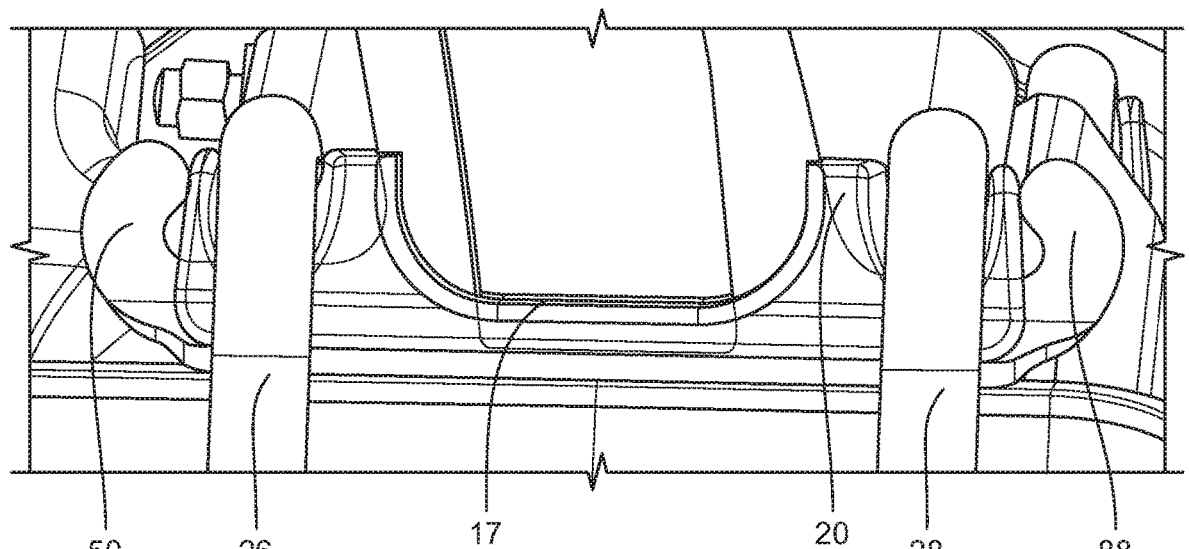
FIG. 4F is an enlarged, left side elevational view of select components of the embodiment shown in FIGS. 1A-4B with the top mounting pad of the axle coupling assembly in phantom.

An opening in the bottom surface of the base 42 defines a cavity 15 in which the first example suspension travel control formation is received. (FIG. 4E). The cavity 15 extends vertically through the mounting pad 20 exiting the top surface between the U shaped fastener engagement surfaces 23,25 and stopping short of the top surface between the U shaped fastener engagement surfaces 23,25 and the end faces 19,21 of the top mounting pad 20 (FIG. 4E). When the suspension travel control formation 46 is received within the top mounting pad 20 and this combination is mounted on the main support member 16, the bottom surface of the top mounting pad 20, the interior wall of the cavity 15 of the top mounting pad 20, and the top surface of the main support member 16 secure the suspension travel control formation 46 in place. In this arrangement, the interior wall of the cavity 15 contacts the top surface of the outwardly extending flanges 44A,44B (FIG. 4F), the lateral surfaces and top edge of the shoulder portions 56,58 of the base 42 and the lateral surfaces and exterior edge of the first frame member 62 and third frame member 74 of the body 48 of the suspension travel control formation 46.

Travel of the suspension system 10, including the suspension travel control formation 46, the axle 14 and the main support member 16, is desirably controlled and/or limited by the use of the suspension travel control system of the present disclosure.

During rebound travel of the suspension system 10, the axle 14, the main support member 16 and the suspension travel control formation 46 travel downward generally along a path determined by the design of the suspension system. In this first example, this path generally follows an arc determined by the main support member's pivotal connection with the vehicle frame. As this occurs, the body 48 of the suspension travel control formation 46 travels downward along this arc about the stop post 34 until the contact surface 38 on the top exterior surface of the stop post 34 is engaged by the interior surface of the second frame member 68, limiting further downward travel of the suspension travel control formation 46, the main support member 16 and the axle 14 relative to the vehicle frame. It is preferable during normal or ordinary operating conditions that the interior surfaces of the first frame member 62 and the third frame member 74 avoid or minimize sustained contact with the exterior surface of the stop post 34 during downward rebound travel of the suspension system.

The suspension travel control system of the present disclosure may also be configured to provide longitudinal redundancy in one or more directions as discussed below. In the event of the failure of a suspension linkage or component, the axle 14, the main support member 16 and/or the suspension travel control formation 46 may shift in a direction that is generally perpendicular to or nonparallel to or askew of the path or direction of travel of the axle 14 and the main support member 16 during normal or ordinary operating conditions. In the event of such a failure, generally radially inward or forward translational movement of the axle 14 or the main support member 16 will be limited by the engagement of the interior surface of the third frame member 74 with the opposing contact surface 37 on the exterior surface of the stop post 34. Generally radially outward or rearward translational movement of the axle 14 or the main support member 16 will be limited by the engagement of the interior surface of the first frame member 62 and the opposing contact surface 35 on the exterior surface of the stop post 34.

Figure 11:
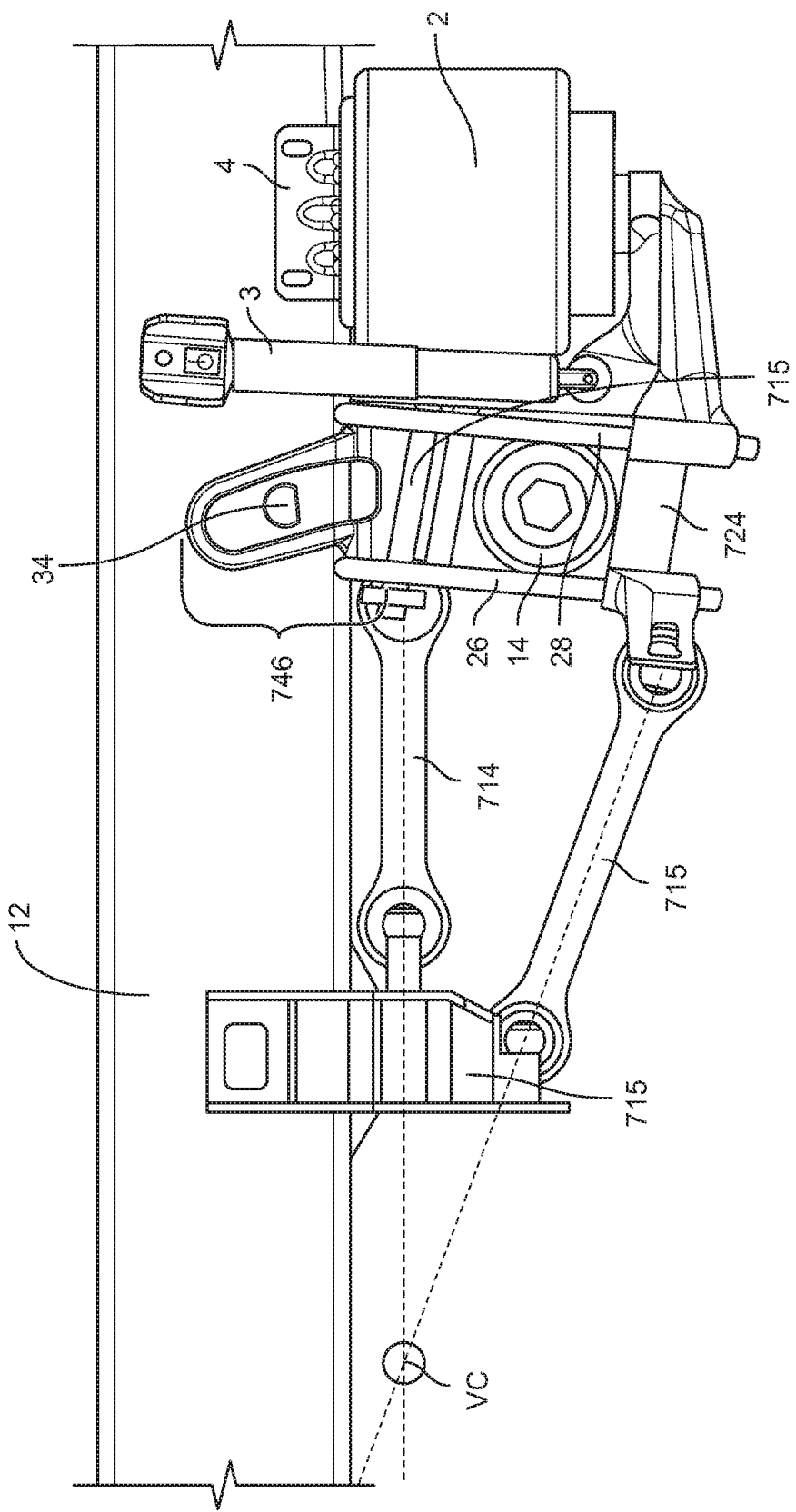
FIG. 11 is a side elevational view of a multilink suspension having non-parallel upper and lower control arms and incorporating a suspension travel control system of the present disclosure.

It will be appreciated that the size, shape and orientation of the suspension travel control formation may vary in accordance with the design and travel path of the suspension system without departing from the scope of the present disclosure. As one example shown in FIG. 11, a 4 bar linkage suspension, as referred to in the art, includes non-parallel suspension linkages in the form of non-parallel upper and lower control arms (714,715) resulting in a configuration where a theoretical extension of these linkages identifies a virtual center of rotation (designated as "VC" in FIG. 11) or axis of rotation where the extended centerlines of the control arms intersect, at a location that is spaced apart from and on the opposite side of the hanger bracket from the axle. The upper control arm 714 is pivotally connected at one end to a frame hanger 708 and at another end to a top mounting pad 720 of the axle coupling assembly. The lower control arm 715 is pivotally connected at one end to the frame hanger 708 and at another end to a bottom mounting pad 724 which also provides a seat or mount for an air spring 2 and a shock absorber 3, each of which are connected at their respective upper ends to the vehicle frame. It will be appreciated that as the axle 14 undergoes movement during normal or ordinary operating conditions, generally in a vertical direction, the intersection of the extended centerlines of the control arms and thus the virtual center of rotation of the suspension system will also move. As the distance between the virtual center and the axle decreases over the range of motion of the suspension system, the travel path of the axle may bend more sharply towards the virtual center. As the distance between the virtual center and the axle travel path increases, the travel path of the axle may bend further away from the virtual center. Additionally, the base of the suspension travel control formation 746 resembles a wedge to accommodate the angled orientation of the axle. The size, shape and orientation of the suspension travel control formation can be varied or customized to different suspension types without departing from the scope of the present disclosure. The suspension system of FIG. 11 is shown and described in U.S. Pat. No. 9,085,212, the entirety of which is incorporated herein by reference.

Figure 6A:
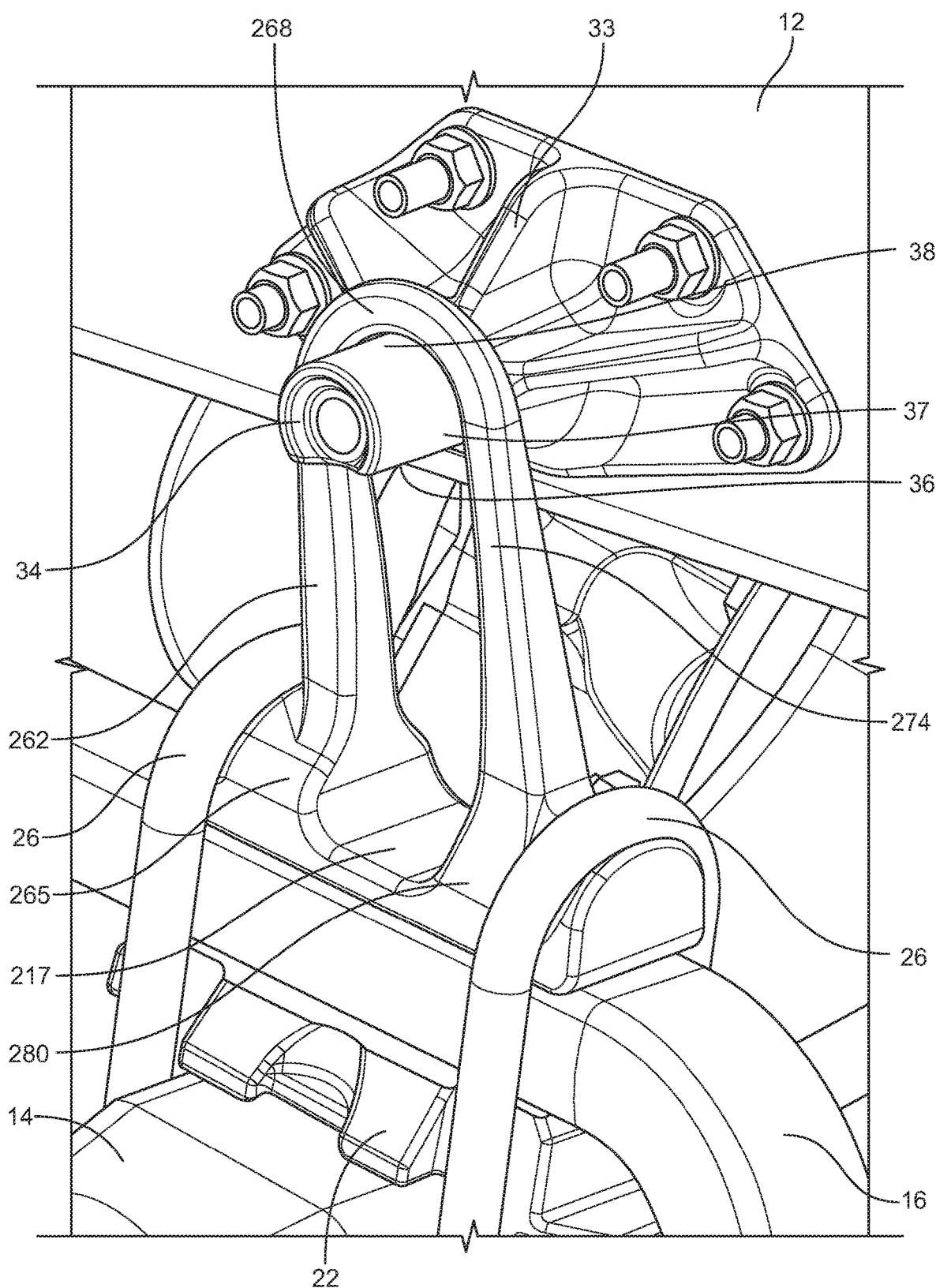
FIG. 6A is upper rear perspective view of a portion of a vehicle suspension system incorporating a suspension travel control system in rebound position according to a third embodiment of the present disclosure.
Figure 6B:
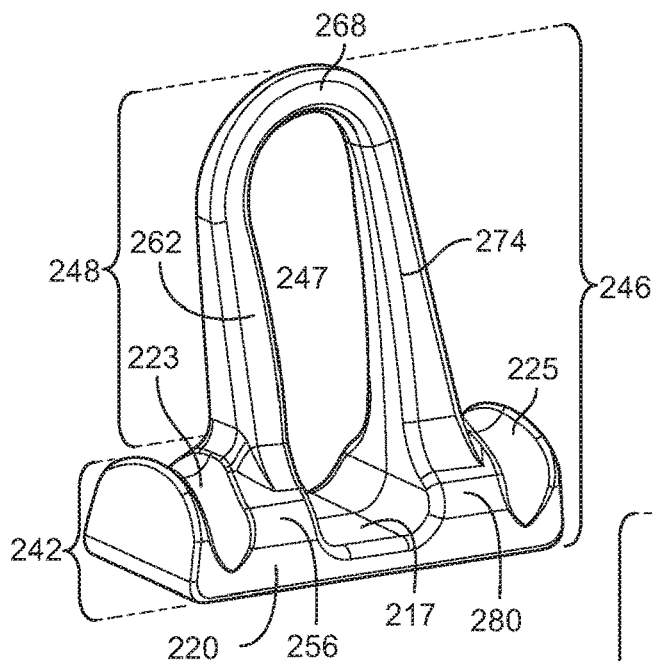
FIG. 6B is a left side, upper front perspective view of a select component of the embodiment shown in FIG. 6A.
Figure 6C:
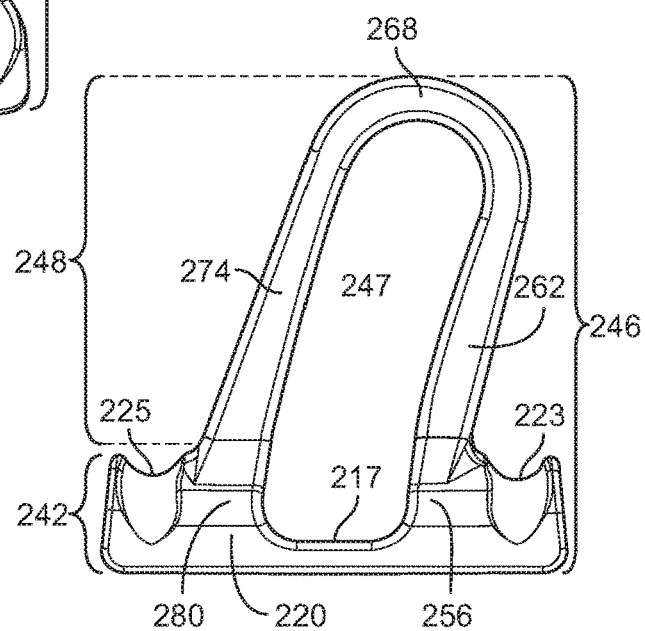
FIG. 6C is a side elevational view of the select component shown in FIG. 6B.
Figure 6D:
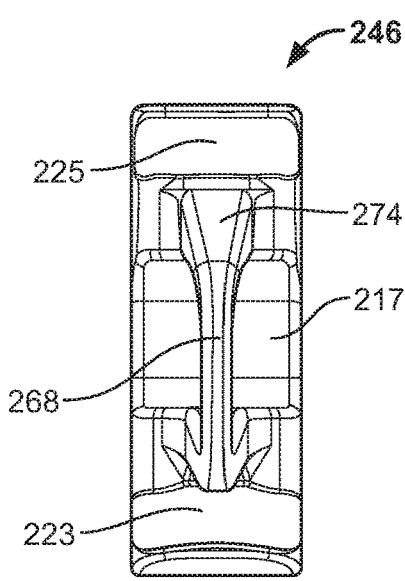
FIG. 6D is a top perspective view of the select component shown in FIGS. 6B-6C.
Figure 6E:
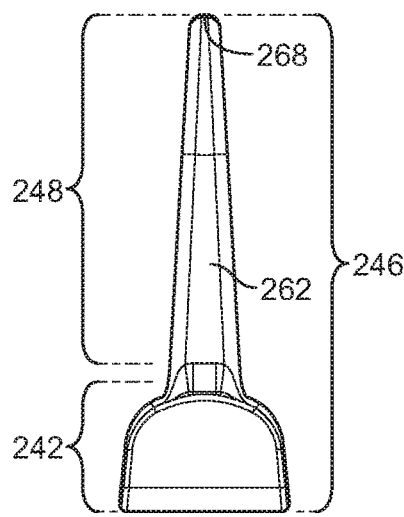
FIG. 6E is a front end view of the select component shown in FIGS. 6B-6D.
Figure 12:
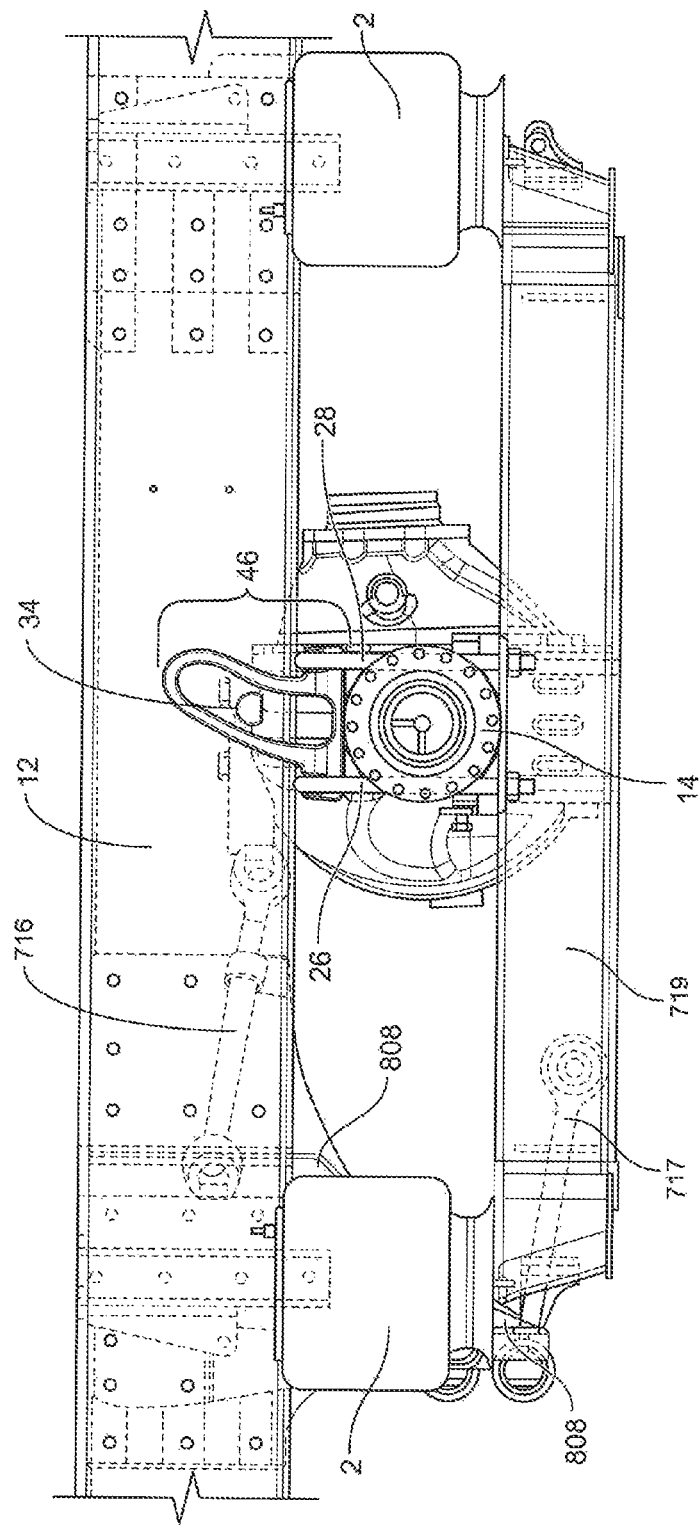
FIG. 12 is side elevational view of a four bag suspension system incorporating a suspension travel control system of the present disclosure.

The suspension system of FIG. 12 is a four air bag suspension appropriate for coaches and passenger buses among other types of vehicles and is similar to that shown and described in U.S. Publication No. 2016/0280026A1, the entirety of which is incorporated herein by reference. Suspension linkages in the form of an upper control arm 716 pivotally connected at one end to the vehicle frame 12 and at the other end to the axle 14 and a lower control arm 717 pivotally connected at one end to the lower portion of a frame hanger 708 and at another end to another suspension linkage in the form of a suspension beam 719. An air spring 2 is positioned between each of the forward and rearward end portions of the suspension beam 719. The suspension travel control formation 46 of the suspension system of FIG. 12 is similar to the suspension travel control formation of FIG. 6A rotated 180 degrees (or as shown in FIG. 6C). The shape of its arc bends to the right in accordance with the travel path or movement of the axle during normal or ordinary operation of this suspension system.

The second through sixth, and the eighth and ninth example suspension travel control systems, for purposes of illustration and facilitating discussion, are shown as being deployed on the same type of suspension system as shown in FIGS. 4A and 4B. Accordingly, the same reference numerals and descriptions above with respect to the first example apply as to those same components. Except as described or as noted below, the example suspension travel control systems discussed below feature functionality and construction that is similar to those described in the embodiment of FIGS. 4A and 4B. It will be appreciated that each of the example suspension travel control systems are not limited to the particular suspension system in which they are illustrated and may be deployed a variety of suspension systems without department from the scope of the present disclosure.

A suspension travel control formation for a second example suspension travel control system is indicated in general at 146.

Figure 5A:
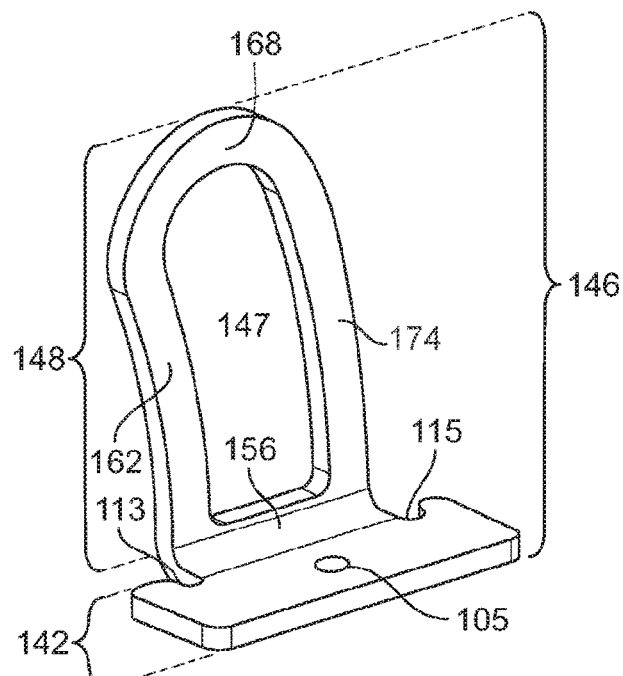
FIG. 5A is a suspension travel control formation of a second embodiment of the present disclosure.

The second example, suspension travel control formation 146 has a body 148 and a base 142 (FIG. 5A). The body 148 provides an interior surface defining an interior space or slot 147.

Figure 5B:
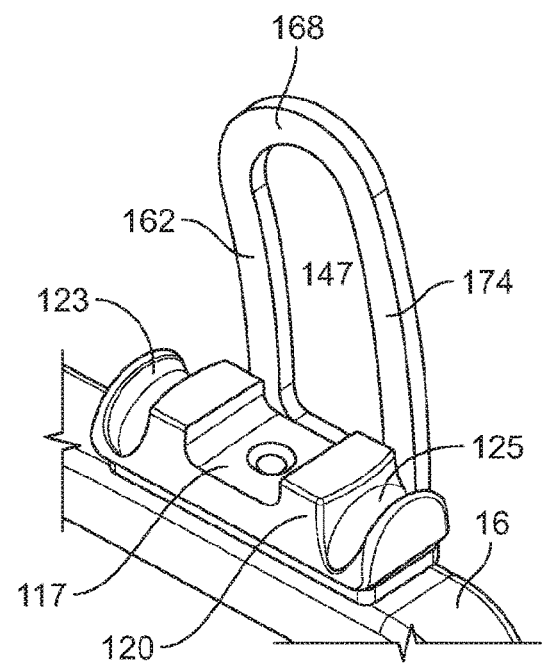
FIG. 5B is a upper rear perspective view of selected components of a vehicle suspension incorporating a suspension travel control system according to a second embodiment of the present disclosure
Figure 5C:
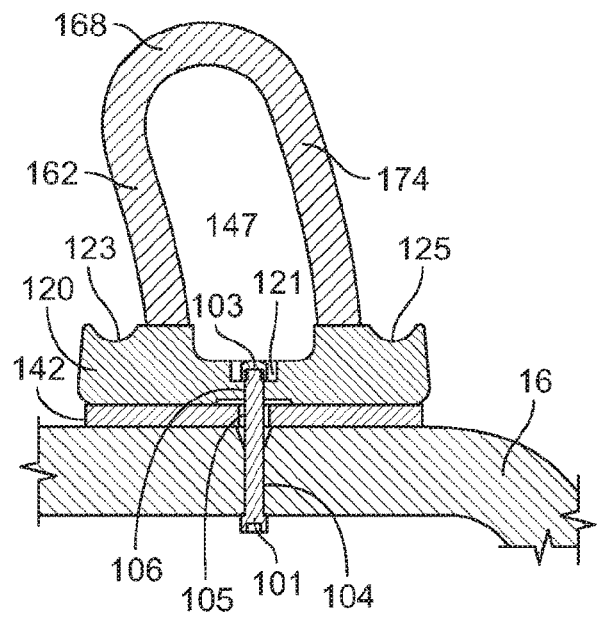
FIG. 5C is cross sectional side view of the subject matter shown in FIG. 5B taken through the centerbolt along a vertical plane parallel to the main support member.

In this second example, the body 148 is positioned on the inboard side of the suspension travel control formation 146. The inboard side of the body 148 may be generally flush with inboard lateral edge of the main support member 16. The body 148 includes a first frame member or first portion 162, a second frame member or second portion 168, and a third frame member or third portion 174, which together provide the interior surface defining an elongated interior space 147. (FIGS. 5A-5C). The first, second and third frame members 162, 168, 174 each have first and second longitudinal end portions. The first and third frame members 162, 174 are spaced apart and extend vertically from their respective first longitudinal end portions which are connected to or transition from a shoulder portion 156 to follow an arc that is generally consistent with the arc of rotation of the main support member 16 about its pivotal connection with the vehicle frame. The second longitudinal end portions of the respective first frame member 162 and third frame member 174 connect or transition into respectively, first and second longitudinal end portions of the C- or U-shaped second frame member 168 located at the top end portion of the elongated space 147.

Figure 5D:
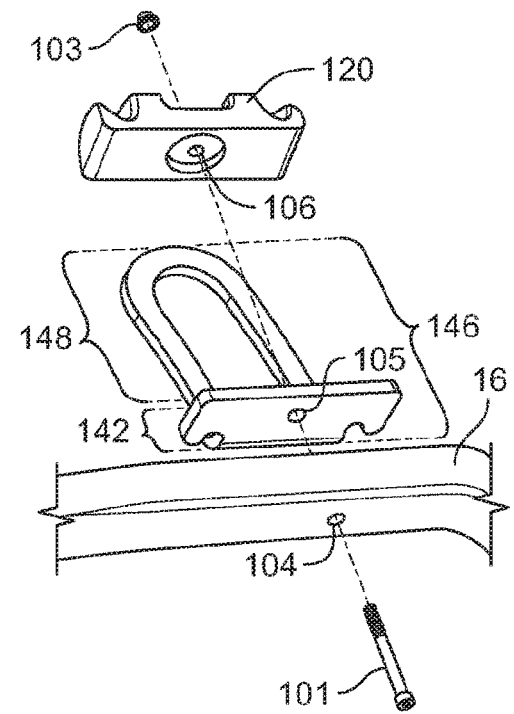
FIG. 5D is an exploded, left side, lower front perspective view of the subject matter of FIG. 5B.

As shown in FIG. 5A, the base 142 of the suspension travel control formation 146 supports the body 148 and extends in the longitudinal and lateral directions and is positioned between the bottom surface of the top mounting pad 120 and the top surface of the main support member 16. The base 142 connects or transitions into the body 148 via shoulder portion 156 on the inboard side of the base 142. Fore and aft of the shoulder portion are, respectively, first and second grooves 113,115 which improve component fit and joint integrity of the assembly shown in FIGS. 5c and 5d.

A depression or recess in the top surface of the top mounting pad 120 between the fastener engagement surfaces 123,125 presents a contact surface 117, which during vehicle operation, is intermittently brought into contact with a stop surface or contact surface positioned on the bottom exterior surface of the stop post to limit upward jounce travel or other lifting of the main support member, the axle and/or the suspension system. The creation of the recess that presents contact surface 117 on the top surface of the top mounting pad 120 reduces its weight and also permits a greater range of travel of the main support member 16 to the jounce position within the packaging constraints of the suspension system.

The main support member 16, which in this example is a longitudinally oriented, generally Z-shaped leaf spring, also includes a locator 106, shown for example in the form of a passageway 106, 105, 104 that extends in alignment through the main support member 16, the base 142 of the suspension travel control formation 16 and the top mounting pad 120. In this example, the passageway receives a through bolt 101 or externally threaded fastener that is secured in place by a nut or connector 103, positioned in counterbore 121 in the top mounting pad 120. Preferably, the counterbore is of sufficient depth to place the fastener assembly below surface 117 to avoid direct contact between the fastener assembly and the contact surface of the stop post when the suspension is in the jounce position. It will be appreciated that the locator and fastener assembly of the type shown in FIGS. 5B through 5D help to position and hold the main support member 16, the suspension travel control formation 146 and the top mounting pad 120 together, in proper longitudinal and lateral relation to one another and within the axle coupling assembly in which they will eventually be incorporated. This feature also permits the main support member 16, the suspension travel control formation 146 and the top mounting pad 120 to be shipped in assembled form, minimizing the number of parts that need to be separately handled and inventoried in downstream production of a suspension system or wheeled vehicle.

As shown in FIGS. 6A-6E, a third example, suspension travel control formation 246 has a body 248 and a base 242 which are integrated with the top mounting pad in a single, one piece construction.

As in the first example, the body 248 of the suspension travel control formation 246 includes a first frame member or first portion 262, a second frame member or second portion 268, and a third frame member or third portion 274, which together provide the interior surface defining an elongated interior space 247. The first, second and third frame members 262, 268, 274 each have first and second longitudinal end portions. The first frame member 262 and the third frame member 274 are spaced apart. The first and third frame members 262, 274 extend vertically from their respective first longitudinal end portions which are connected to or transition from respectively, separate shoulder portions 256, 280 to follow a path that is generally consistent with or parallel to the path or direction of travel of the main support member and axle during normal or ordinary operating conditions, which in this example, is an arc that is generally consistent with or parallel to the an arc defined by the pivotal rotation of the main support member 16 about its rotational axis. The second longitudinal end portions of the respective first frame member 262 and third frame member 264 connect or transition into respectively, first and second longitudinal end portions of the C- or U-shaped second frame member 268 located at the top end portion of the elongated space 247.

The base 242 incorporates a top mounting pad which has U shaped fastener engagement surfaces 223, 225 for receiving U shaped fastener assemblies 26,28 which clamp together the components of the axle coupling assembly in fixed relation to one another. The base 242 connects or transitions into the body 248 via shoulder portions 256, 280. A depression or recess in the top surface of the top mounting pad 220 between the fastener engagement surfaces 223,225 presents a surface 217, which during vehicle operation, is intermittently brought into contact with a stop surface or contact surface 36 positioned on the bottom exterior surface of the stop post 34 to limit upward jounce travel or other lifting of the main support member 16, the axle and/or the suspension system. The creation of the recess that presents surface 217 on the top surface of the top mounting pad 220 reduces its weight and also permits a greater range of travel of the main support member 16 to the jounce position within the packaging constraints of the suspension system.

The third example suspension travel control formation 246 is preferably cast as an integrally formed, one piece structure, however, it may also be manufactured using any other suitable method and material, as a single or multi-piece structure.

Figure 7:
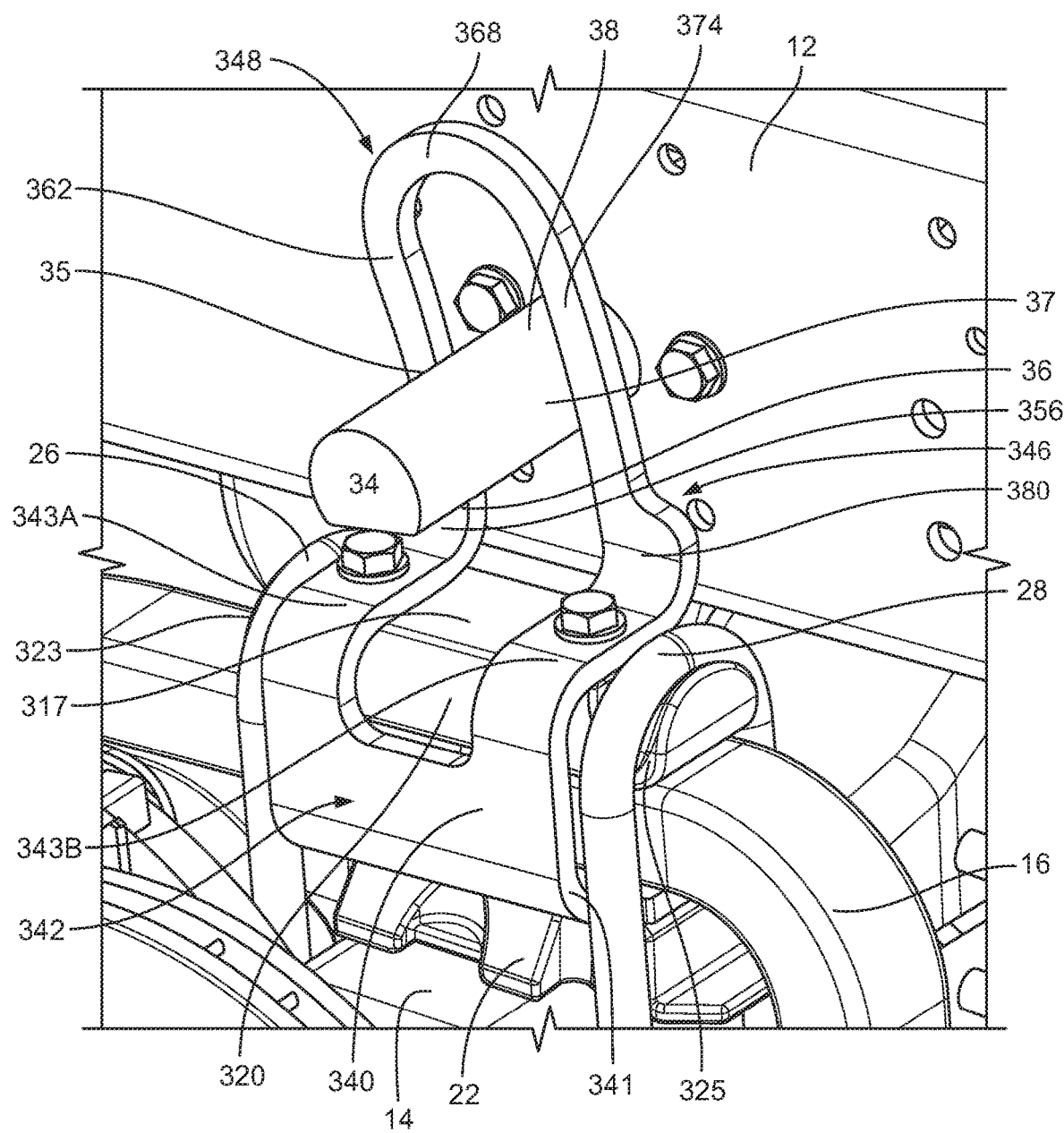
FIG. 7 is upper rear perspective view of a portion of a vehicle suspension system incorporating a suspension travel control system in a neutral state according to a fourth embodiment of the present disclosure.

As shown in FIG. 7, a fourth example suspension travel control formation 346 has a body 348 and a base 342.

As in the first example, the body 348 of the suspension travel control formation 146 includes a first frame member or first portion 362, a second frame member or second portion 368, and a third frame member or third portion 374, which together provide the interior surface defining an elongated interior space 347. The first, second and third frame members 362, 368,374 each have first and second longitudinal end portions. The first frame member 362 and third frame member 374 are spaced apart and extend vertically from a respective first longitudinal end portion that is connected to or transitions from a separate shoulder portion 356, 380 to follow an arc that is generally consistent with the arc of rotation of the main support member 16 about its pivotal connection with the vehicle frame 12. The second longitudinal end portions of the respective first frame member 362 and third frame member 364 connect or transition into respectively, first and second longitudinal end portions of the C- or U-shaped second frame member 368 located at the top end portion of the elongated space 347.

The base 342 of this fourth example resembles a clamp like structure and includes a first plate 341 and a second plate 343A,343B which are connected by a vertical wall 340. The first plate 341 is horizontally disposed between the axle 14 and the main support member 16. A caster wedge 22 is also present between the axle 14 and the main support member 16. In the transition from the vertical wall 340 to the second plate 343A,343B, the second plate presents two, spaced apart sections 343A,343B which overlay the top mounting pad and are fixedly secured thereto by fasteners that extend though each section of the second plate 343A, 343B into the top mounting pad. The exposed portion of the top surface 317 of the top mounting pad 320 provides a direct contact surface for engagement with the bottom exterior surface 36 of the stop post 34 to limit upward jounce travel of the main support member 16, axle 14 and suspension travel control formation 346. First and second U shaped U shaped assemblies 26,28 received within respective engagement surface 23,25 of the top mounting pad clamp together the components of the axle coupling assembly.

The fourth example suspension travel control formation 346 is preferably fabricated from steel plate material, however, it may also be manufactured using any other suitable method and material, as a single or multi-piece structure.

The fifth and sixth example suspension travel control formations 446 show different techniques for positioning and securing the body 448,548 of the suspension travel control formation 446,546 closer to the pivotal connection of the first end of the main support member 16. In each instance, the body 448,548 is positioned above a location along the length of the main support member 16 between the axle 14 and the first end of the main support member 16. It will be appreciated that moving the body 448,548 of the suspension travel control formation 446,546 closer to the axis of rotation of the main support member 16 reduces the amount of vertical displacement which the body of the suspension travel control formation 446,546 must accommodate in a given suspension system, and accordingly its vertical size.

In the fifth example, the body 448 of the suspension travel control formation 446 has an elongated interior space 447 defined by an interior surface or interior edge having a first side or first portion 462, a second side or second portion 468, a third side or third portion 474, and a fourth side or fourth portion 476. In this example, the body 448 itself encloses the interior space 447. The first side portion 462 and third side portion 474 are spaced apart and extend vertically from their connection with the fourth side or fourth portion 476 positioned at the bottom of the interior space 447. The first side portion 462 and third side portion 474 also connect or transition into the second side portion 468, located at the top of the interior space 447. The fourth side portion 476 is positioned and configured for engagement with contact surface 36 on the bottom exterior surface of the stop post 34 to limit upward jounce travel of the suspension system.

The body 448 is connected proximate its third side portion 474 to a generally vertical member 443 of an L shaped base 442, the horizontal member 441 of which is positioned between the main support member 16 and top mounting pad 320. A support bracket 427 having a first flange attached to the top of the mounting pad and a second flange attached to the vertical member 443 of the L-shaped base on the side opposite the body 448 reinforces the strength and positioning of the body relative to the base 442. The body 448 and the base 442 can be formed from the same piece of steel, or alternatively, the body can also be a separate piece that presents an outboard flange for attachment to the vertical member 443 of the L-shaped base using the same fasteners as are used for the second flange of the support bracket. A body 448 that is separately formed from the base 442 and reversibly secured thereto with threaded fasteners or other suitable fastening techniques as last described permits the body 448 to be installed, serviced or replaced without disassembling the axle coupling assembly.

Figure 8:
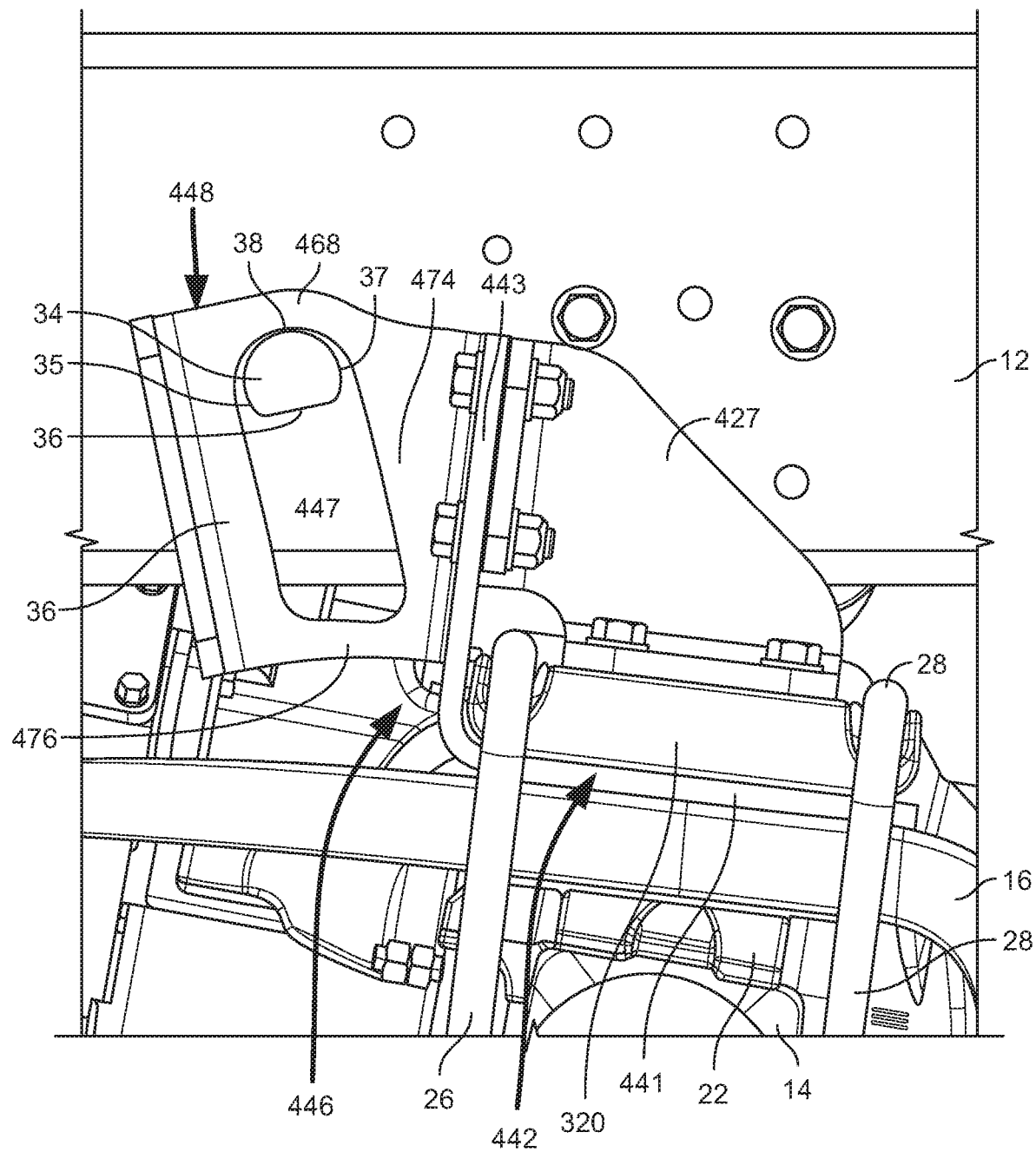
FIG. 8 is side elevational view of a portion of a vehicle suspension system incorporating a suspension travel control system in rebound position according to a fifth embodiment of the present disclosure.
Figure 9:
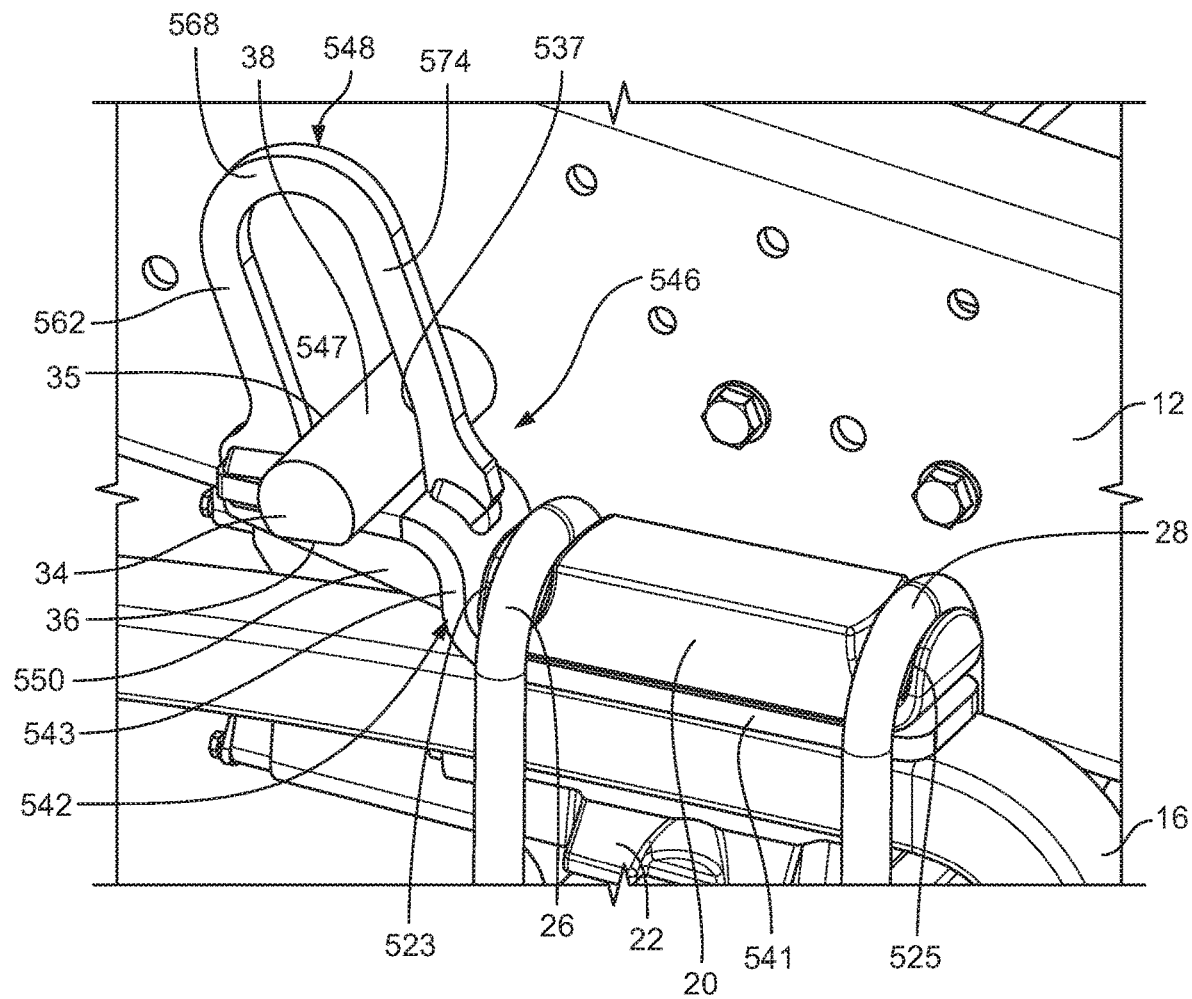
FIG. 9 is a side, upper rear perspective view of a portion of a vehicle suspension system incorporating a suspension travel control system in jounce position according to a sixth embodiment of the present disclosure.

In the sixth example suspension control formation 546, the body 548 of the suspension travel control formation 546 is supported by the base 542 positioned in a manner similar to that of a braced cantilever and without requiring an additional support bracket similar to that shown in FIG. 8.

In the sixth example, the body 548 of the suspension travel control formation 546 includes a first frame member or first portion 562, a second frame member or second portion 568, and a third frame member or third portion 574, each having a first longitudinal end portion and a second longitudinal end portion. The first frame member 562 and third frame member 574 are spaced apart. Each extends vertically from the first longitudinal end portion which is connected to or transitions from a second portion of the base 542 positioned outside of the U shaped fastener assembly to follow an arc that is generally consistent with the arc of rotation of the main support member 16 about its pivotal connection with the vehicle frame 12. The second longitudinal end portion of the first frame member 562 and the third frame member 574 connect or transition into respectively, the first and second longitudinal end portions of the C- or U-shaped second frame member 568 located at the top end portion of the elongated interior space 547.

The base 542 has a first portion 541 and second portion 543. The former extends in the longitudinal and lateral directions and is positioned between the main support member 16 and the top mounting pad 20. The first portion 541 of the base 542 transitions into the second portion 543 referred to above which is elevated and longitudinally offset from the first position 541 in the direction of the axis of rotation of the main support member 16. A wedge or wedge portion 550 helps support the second portion 543 of the base 542 and the body 548 in their respective positions.

The seventh example embodiment incorporates the suspension travel control system into a vehicle suspension in a different manner than previously depicted.

Figure 10A:
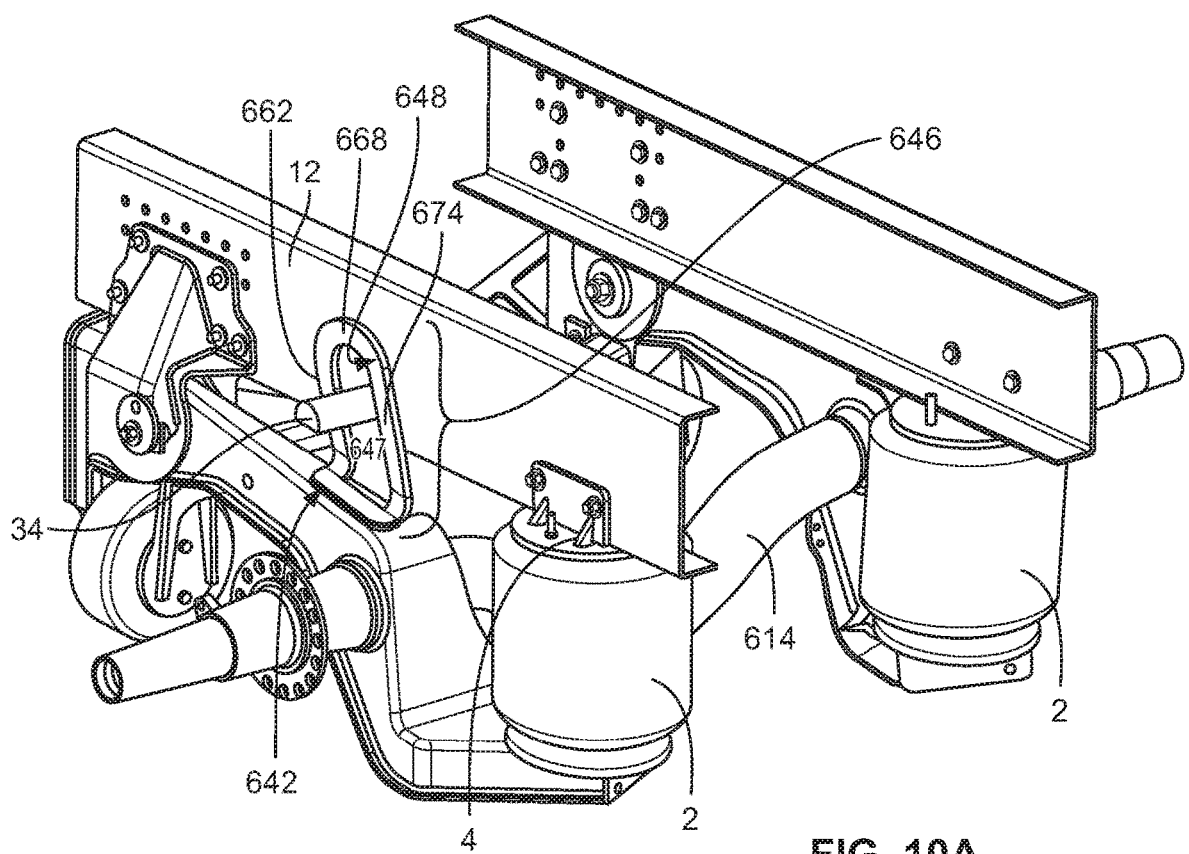
FIG. 10A is a side, upper rear perspective view of a portion of a vehicle suspension system incorporating a suspension travel control system in a neutral state according to a seventh embodiment of the present disclosure.
Figure 10B:
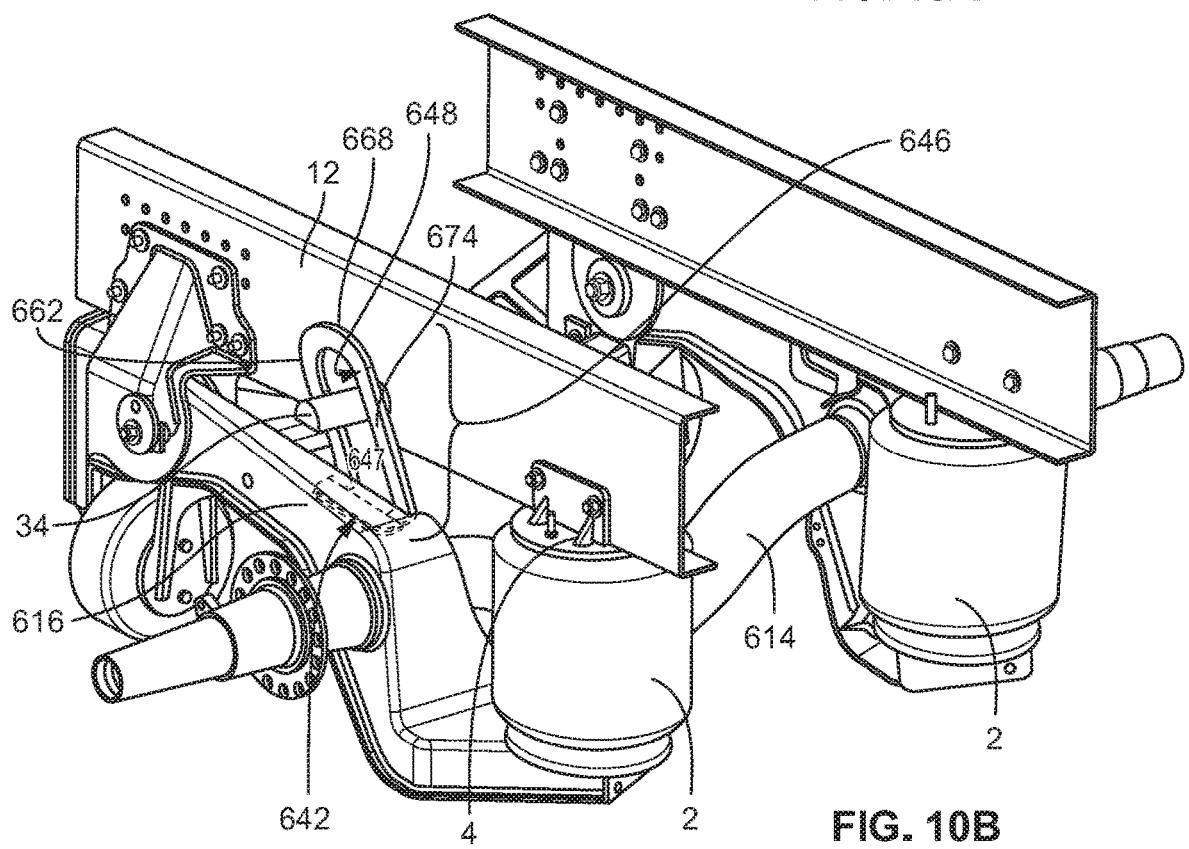
FIG. 10B is a side, upper rear perspective view of a portion of a vehicle suspension system incorporating a suspension travel control system in a neutral state according to a variation of a seventh embodiment of the present disclosure.

FIGS. 10A and 10B show a traditional trailing arm suspension known to those skilled in the art and includes left and right side, pivotally mounted, trailing arms (beams) 616. An axle 614 extends through the trailing arms 616 on both sides of the suspension. An air spring 2 is attached at one end to the distal end of the beam and at another end to the bracket 4 connected to the vehicle frame member 612.

A suspension travel control system of the present disclosure as incorporated in this seventh example includes a stop post 34 connected directly to the vehicle frame member 12 and a suspension travel control formation 646 which includes a body 648 and a base 642.

The body 648 has an interior surface defining an interior space 647. The body of the suspension travel control formation includes a first frame member or first portion 662, a second frame member or second portion 668, and a third frame member or third portion 674, each having a first longitudinal end portion and a second longitudinal end portion. The first frame member 662 and third frame member 674 are spaced apart 642. Each extends vertically from its first longitudinal end portion which is connected to or transitions from the base 642 to follow an arc that is generally consistent with the arc of rotation of the suspension linkage, which in this example, is a leading arm/trailing arm 616, about its pivotal connection with the vehicle frame. The second longitudinal end portions of the first frame member 662 and the third frame member 674 connect or transition into respectively, the first and second longitudinal end portions of the C- or U-shaped second frame member 668 located at the top end portion of the elongated interior space 647.

The base 642 of the suspension travel control formation 646 is welded but may also be connected by other suitable means to the top surface of the leading arm/trailing arm 616 in FIG. 10A and to the inboard side of the leading arm/trailing arm 616 in FIG. 10B.

As shown in FIGS. 13A through 13E, an eighth example suspension travel control formation 846 has a body 848 and a base 842. Each of the body 848 and the base 842 have a corresponding first end 848A, 842A and a corresponding second end 848B,842B. Engagement surfaces adjacent to and/or surrounding bores at the end of each of the body and the base are brought into registration and secured together with the use of fastener 827,829. The reversible connection between the body 848 and the base 842 gives a manufacturer greater flexibility in the installation, adjustment and repair of the suspension travel control system of the present disclosure in a vehicle suspension system.

The body 848 of this eighth example is formed of a link having a first end 848A and a second end 848B and includes a first or forward portion or arm 862, a second or middle portion or arm 868, and a third or rear portion or arm 874, which provide an interior surface defining an elongated interior space 847 in which a stop post 834 is positioned during use. The stop post 834 is intended for securement at its first end to the vehicle frame member by bracket 834. From the first end of the base 842, the link extends in the general direction of the opposite or second end of the base 842, traversing the space over shoulder portion 856 of the base. The link then turns up or away from the base 842, forming an elbow 861 having an acute or slightly acute angle when measured on the exterior side of the body of the suspension travel control formation. As the link continues in a direction that is generally up or generally away from the base 842, it may drift slightly back in the direction of the first end of the base before it turns back in the direction of the second end of the base to form the second or middle portion or arm 868 which in this example is arcuate or C or U shaped. A point of inflection 865 may be created near or adjacent the transition between the first or forward portion or arm 862 and the second or middle portion or arm 868. After completing the formation of the second or middle portion or arm 868, the link forms the third or rear portion or arm 874 of the body 848 on the opposite side of the elongated interior space 847 from the first or forward portion or arm 862, continuing in the direction of the second end of the base 842.

The base 842 of the eighth embodiment incorporates atop mounting pad 820 which has U shaped fastener engagement surfaces 823,825 for receiving U shaped fastener assemblies 26,28 which clamp together the components of the axle coupling assembly in fixed relation to one another. A depression or recess in the top surface of the top mounting pad 820 between shoulder portions 856, 880 presents a surface 817 which serves as a jounce pad. During vehicle operation, surface 817 is intermittently brought into contact with a stop surface or contact surface positioned on the bottom exterior surface of the stop post 834 to limit upward jounce travel of the main support member 16, the axle and/or the suspension system. The creation of the recess that presents surface 817 on the top surface of the top mounting pad 820 reduces its weight and also permits a greater range of travel of the main support member 16 to the jounce position within the packaging constraints of the suspension system.

While the interior surface of the first or forward portion or arm 862 and the third or rear portion or arm 874 are available to provide longitudinal redundancy, as described herein, it will be appreciated that the pocket in the lower left hand corner of the space available for movement of the stop post 834 within the suspension travel control formation 846 is formed by the inside surface of shoulder portion 856 and the lower surface of elbow 861 in the interior of the body of the suspension travel control formation. In the event of a substantial break in the main support member 16 between the axle and its connection with the frame member, the main support member will shift up and to the right relative to the position of the stop post in the perspective shown in FIG. 13E. The addition of the lower surface of the elbow or other structural element along the upper perimeter of this pocket provides it with a clearance fit to receive and temporarily hold the stop post, as desired, for additional stability and control during this type of break or failure of the main support member.

Figure 13F:
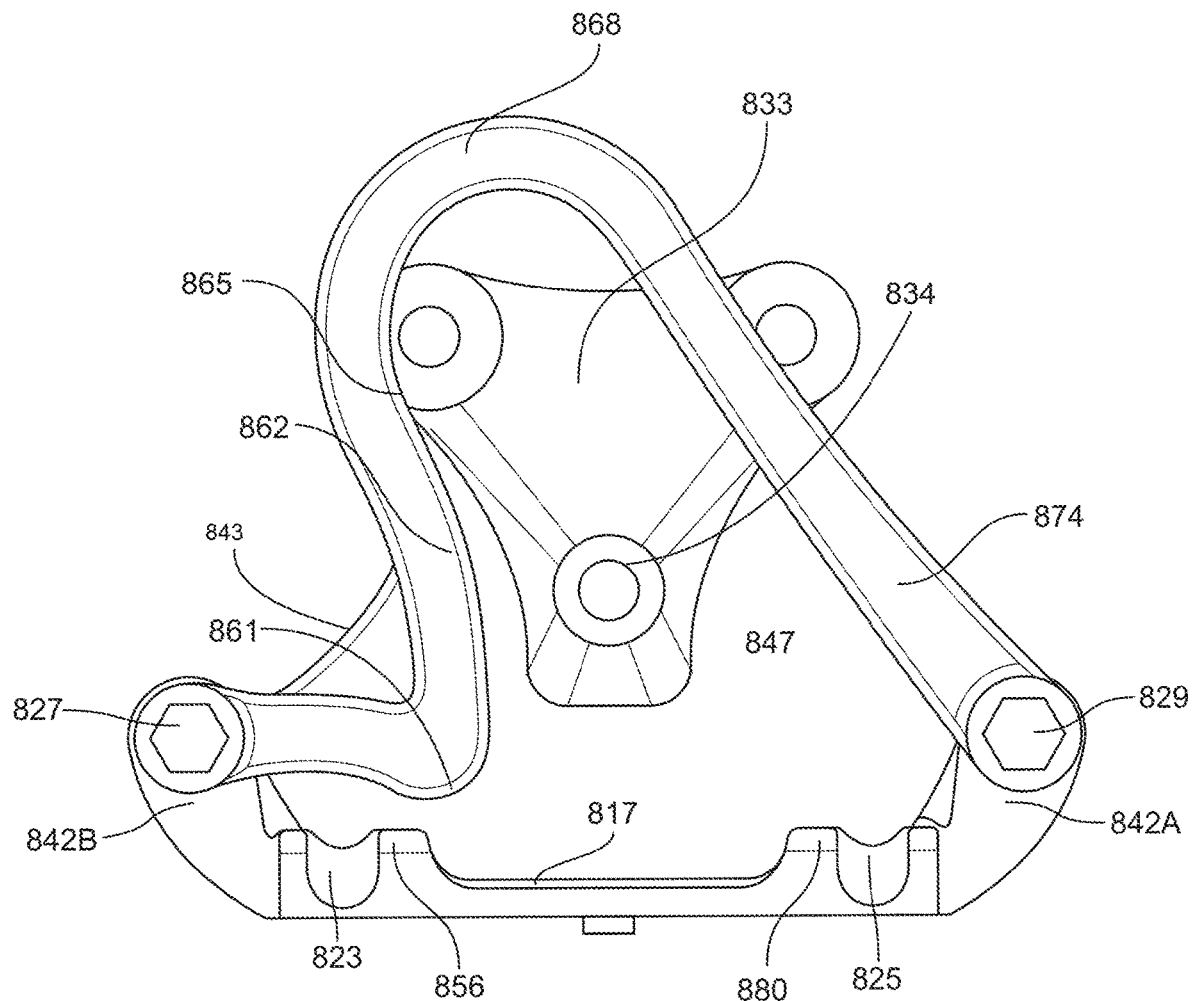
FIG. 13F is a elevational view of the embodiment shown in FIG. 13B with an example reinforcement structure added to the body of the suspension travel control formation.

As shown in FIG. 13F, it will be appreciated that the body of the suspension travel control formation can be optionally reinforced by the addition of a brace or bracket 843 on the exterior side and in the acute angle portion of the elbow 861. This reinforcement provides the first or forward portion or arm, and accordingly the body 848 and the suspension travel control formation 846 as a whole with greater strength and rigidity.

As shown in FIGS. 14A-14F, a ninth example embodiment suspension travel control formation 946 includes a body 948 and a base 842. This ninth example suspension travel control formation 946 is illustrated with the same base 842 as is used to illustrate the eighth example, however, it will be appreciated that the base of both examples can be varied without departing from the scope of the present disclosure. Each of the body 948 and the base 842 has a corresponding first end 948A,842A and a corresponding second end 948B,842B. Engagement surfaces adjacent to and/or surrounding bores at the end of each of the body and the base 948A,842A;948B,842B are brought into registration and secured together with the use of a fastener 827,829. The reversible connection between the body 948 and the base 842 offers the same benefits for this example as discussed previously herein.

The body 948 is formed of a main link having a first or forward portion or arm 962 which includes a reinforcement structure discussed in further detail below, a second or middle portion or arm 968 having an arcuate or C or U shape, and a third or rear portion or arm 974. The interior facing surface of the reinforced first or forward portion or arm 962, second or middle portion or arm 968, and third or rear portion or arm 974 defines an elongated interior space 947 in which a stop post 834 is positioned. The stop post 834 is intended for securement at its first end to the vehicle frame member by bracket 838.

Figure 14A:
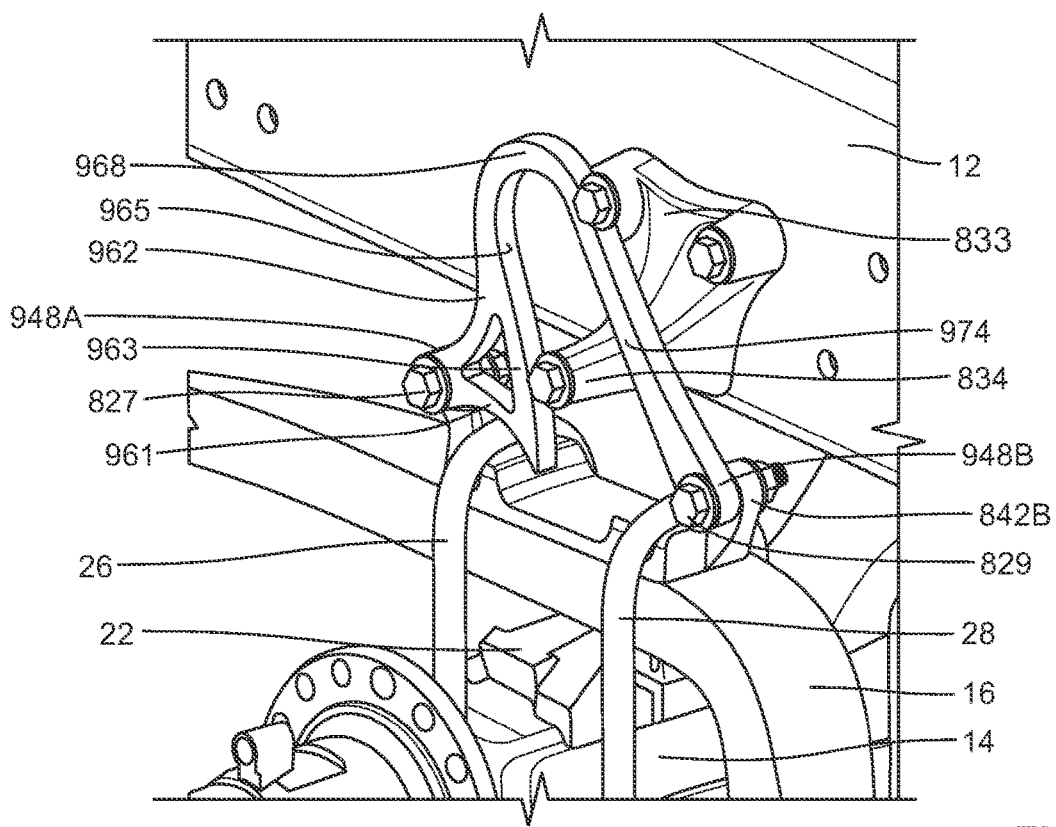
FIG. 14A is a upper, rear perspective view of selected components of a vehicle suspension in a neutral state incorporating a suspension travel control system according to a ninth embodiment of the present disclosure.
Figure 14B:
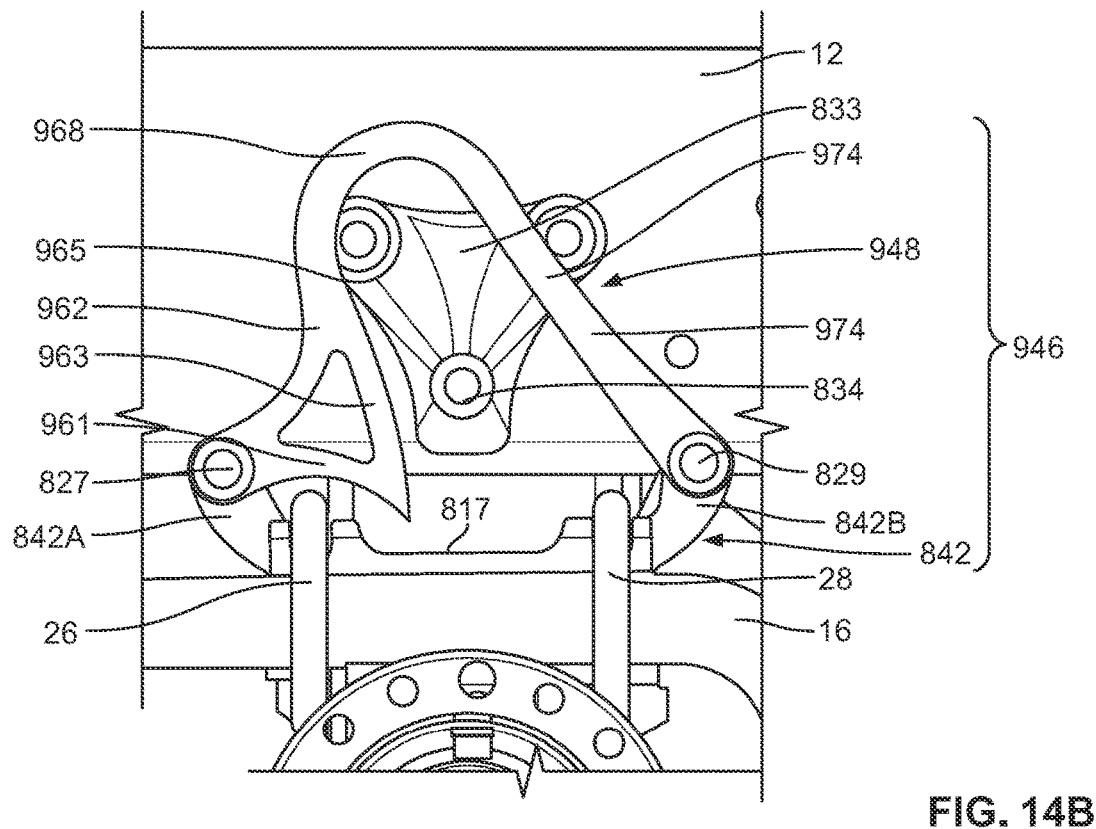
FIG. 14B is a side, elevational view of the subject matter shown in FIG. 14A.

The body 948 or portions thereof can be reinforced by the integration or attachment of braces, inserts, or subsidiary links or sublinks, an example of which is shown in FIGS. 14B-14C. In this ninth example, the first or forward portion or arm 962 of body 948 includes two sublinks, a first sublink 961 which is connected to the first end of the body 948 and which extends into the interior of the body 948, traversing the space above the shoulder portion 856, connecting or joining with the second sublink 963 which extends or descends into the interior of the body 948 from a location along the main link that begins near or adjacent the transition between the second or middle portion or arm 968 and the first or forward portion or arm 962. The portion of the interior surface of the body provided by the more vertically oriented, second sublink 963 provides longitudinal redundancy, as discussed herein, and may be slightly convex in the direction of the interior of the body 948, creating a point of inflection 965 along the interior surface at or near the transition with the second or middle portion or arm of the body 948. It will be appreciated that the design, shape, orientation and construction of structures providing reinforcement to the body 948 or portion thereof can be varied without departing from the scope of the present disclosure.

The manner and structures for reversibly and irreversibly connecting the body and the base of the suspension travel control formation, as well as the location of corresponding or interlocking structures, can be varied without departing from the scope of the present disclosure.

Figure 15A:
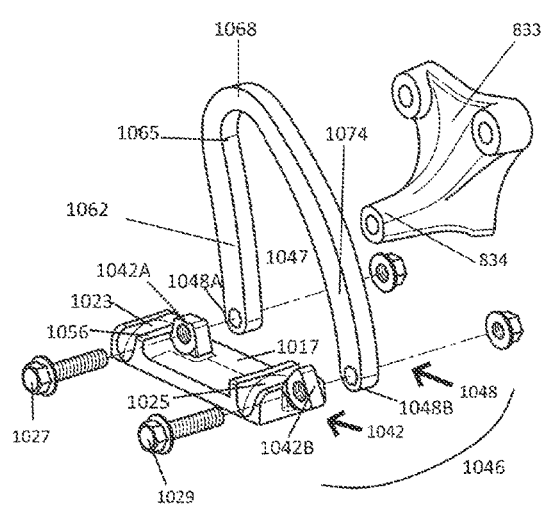
FIG. 15A is an exploded, upper perspective view of a suspension travel control system according to a tenth embodiment of the present disclosure.
Figure 15B:
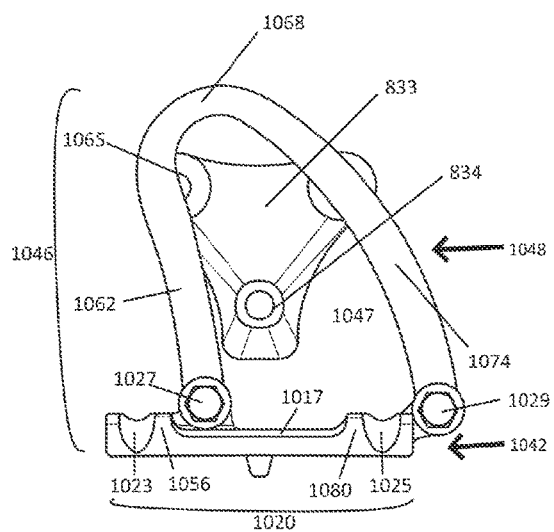
FIG. 15B is a non-exploded, elevational view of the embodiment shown in FIG. 15A in a neutral state.

As shown in FIGS. 15A-15B, a tenth example suspension travel control system 1046 has a body 1048, and a base 1042 which incorporates a top mounting pad 1020. The body 1048 is formed of a link having a first end or a forward end 1048A and a second end or rearward end 1048B and includes therebetween a first or forward portion or arm 1062, a second or middle portion or arm 1068, and a third or rear portion or arm 1074, which together provide an interior surface defining an elongated interior space 1047 in which a stop post 834 is positioned during use. The first or forward portion or arm 1062 and the third or rear portion or arm 1074 are spaced apart and connect or transition into the second or middle portion or arm 1068 which is arcuate or C or U shaped. A point of inflection 1065 may be created near or adjacent the transition between the first or forward portion or arm 1062 and the second or middle portion or arm 1068.

Each of the first end or forward end 1048A and the second end or rearward end 1048B includes a bore 1027, 1029 with adjacent engagement surfaces for connecting the body 1048 with the base 1042 as described below.

The base 1042 incorporating the top mounting pad 1020 has U shaped fastener grooves 1023,1025 for receiving U shaped fastener assemblies (not shown) which clamp together the components of the axle coupling assembly in fixed relation to one another. The U-shaped fastener grooves 1023,1025 are positioned at or adjacent respective shoulders 1056,1080 of the top mounting pad 1020. A first mounting tab 1042A positioned inside and adjacent shoulder 1056 includes a bore with adjacent engagement surfaces. A second mounting tab 1042B positioned on the opposite side of shoulder 1080 from first mounting tab 1042A at the end face of top mounting pad 1020 also includes a bore 1042B with adjacent engagement surfaces. The first and second bores of the body 1048 are positioned in registration with the respective bores of the first and second mounting tabs of the body to reversibly connect the body and the base of the suspension travel control formation. The reversible connection between the base incorporating a mounting pad and the body of the suspension travel control formation permit its assembly to be completed before, during or after the assembly of the suspension system or the installation of the suspension system on a vehicle.

It will also be appreciated that the points of connection of the body and the base may be offset or non-symmetrical in relation to the forward and the rearward end faces of the top mounting pad or the base, or alternatively, they may also symmetrical, as illustrated in other examples set forth herein, without departing from the scope of the present disclosure.

Figure 16A:
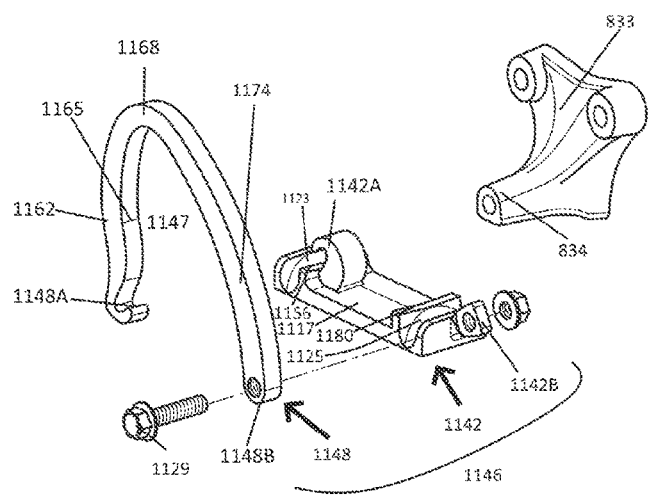
FIG. 16A is an exploded, upper perspective view of a suspension travel control system according to an eleventh embodiment of the present disclosure.
Figure 16B:
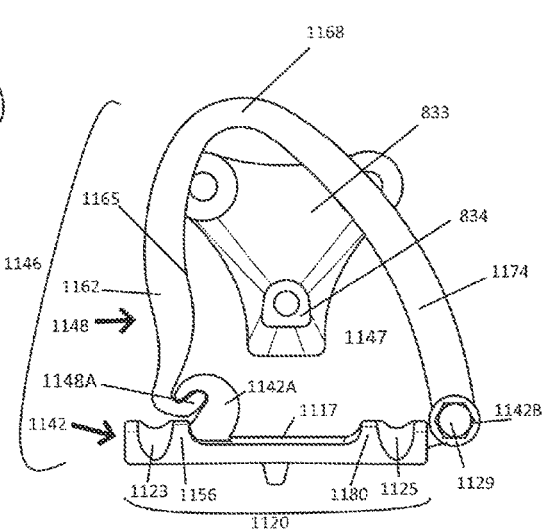
FIG. 16B is a non-exploded, elevational view of the embodiment shown in FIG. 16A in a neutral state.

As shown in FIGS. 16A-16B, an eleventh example suspension travel control formation 1146 has a body 1148 and a base 1142 incorporating a top mounting pad 1120, and is similar to the previous example, except with respect to the configuration of the first end portion or forward end portion 1148A of the body of the suspension travel control formation 1146 and the mounting element in the base with which it reversibly connects. The first end portion or forward end portion 1148A of the body 1146 and the mounting element 1142A of the base respectively resemble opposing, interlocking hooks, thereby preventing separation of the first end portion 1148A of the body from the base during a rebound event without the use of an associated, discrete fastener. It will be appreciated that while the first end portion 1148A of the body 1148 curves in the direction of the interior space 1147 of the suspension travel control formation 1146, the respective shapes of an end portion 1148A and its corresponding mounting element 1142A may be placed in other opposing and/or interlocking configurations that do not require the use of an associated, discrete fastener, including but not limited to reversing the configuration shown in FIGS. 16A-16B so that the first end portion 1148A of the body 1148 curves away from the interior space 1147 of the suspension travel control formation 1146 and the mounting element of the base 1142 curves in the direction of the interior space 1147. Still further, while the first end portion 1148A of the body and first mounting element 1142A of the base 1142 are each received within one another in the example shown in Figure B, an end portion of the body and corresponding mounting element of the base may be restrained without the use of an associated, discrete fastener wherein only one of these two structures is received within the other without departing from the scope of the present disclosure, such as for example, an arrangement wherein the first end of the body presents a cylindrical post or tab that is perpendicular with the adjacent section of the body and is received within a bore of the corresponding mounting element.

Additional techniques and structures for connecting the body and the base of the suspension travel formation of the present disclosure, including reversibly embedding the body into or within the base, include but are not limited to the twelfth and thirteenth examples discussed below.

In the twelfth example shown in FIGS. 17A-17B, the body 1248 of the suspension travel control formation 1246 is reversibly secured to a base 1242 incorporating a top mounting pad 1220.

The body 1248 is formed of a link having a first end or a forward end 1248A and a second end or rearward end 1248B and includes therebetween a first or forward portion or arm 1262, a second or middle portion or arm 1268, and a third or rear portion or arm 1274, which together provide an interior surface defining an elongated interior space 1247 in which a stop post 834 is positioned during use. The first or forward portion or arm 1262 and the third or rear portion or arm 1274 are spaced apart and connect or transition into the second or middle portion or arm 1268 which is arcuate or C or U shaped. A point of inflection 1265 may be created near or adjacent the transition between the first or forward portion or arm 1262 and the second or middle portion or arm 1268.

The end portion 1248A of the first or forward portion or arm 1262 and the end portion 1248B of the third or rear portion or arm 1268 provide a flange, which in the particular variation of this example shown in FIGS. 17A-17B, is generally in the shape of a cylinder, the exterior diameter of which is greater than the adjacent section of the body to which it is attached. The respective, generally cylindrically shaped end portions 1248A,1248B of the body 1248 of the suspension travel control formation 1246 are received in respective, corresponding, generally cylindrically shaped cavities 1215A,1215B defined by a wall in the top mounting pad 1220 between U shaped fastener grooves 1223,1225, the cavities and grooves being positioned in the shoulder portions 1256,1280 of the mounting pad 1220 of the base 1242. The generally cylindrically shaped cavities 1215A,1215B may taper inward slightly and may be slightly frustoconical in shape, as they extend into the top mounting pad 1220. In the version of this embodiment shown in FIGS. 17A-17B, the wall of the top mounting pad 1220 also does not fully encircle or enclose the cavities 1215A,1215B, leaving respective slots 1216A,1216B in approximately the 12 o'clock position to receive the adjacent sections 1262,1268 of the body 1248 and which are generally narrower than the maximum width of the cavities 1215A,1215B. Each cylinder 1248A,1248B defines a bore that receives a fastener 1227, 1229 which on the other side of the cylinder engage either a nut or a threaded bore smaller in diameter than the outer diameter of the cylinder. The exterior surface of the cylinders 1248A,1248B are sized and configured to bind into the base to create a strong joint when the fasteners 1227,1229 are tightened. A recess or depression between the shoulders provides a jounce pad 1217. Longitudinal redundancy, as previously discussed herein, is provided for in the corner portions of the jounce pad and the interior surface of the first or forward portion or arm 1262 and the third or rear portion or arm 1274.

As shown in FIGS. 18A-18B, a thirteenth example suspension travel control formation 1346 is similar to the previous example, except with respect to the shape of the flange at the end portion 1348A,1348B of the first or forward portion or arm 1362 and the third or rear portion or arm 1374 of the body 1348 of the suspension travel control formation 1346, and the corresponding shape of respective cavities 1315A,1315B in the base 1342. Each end portion 1348A, 1348B of the first or forward portion or arm 1362 and the third or rear portion or arm 1374 of the body is made up of one or more sections or stages 1348A1,1348A2;1348B1, 1348B2 which taper inward as one advances along the longitudinal axis of the link that forms the body 1348. Each stage or section 1348A1,1348A2;1348B1,1348B2 may be frustonical in shape or taper in at least one lateral dimension. Tapering may occur within a stage or section and/or between successive stages or sections. The fit between the end portions 1348A,1348B of the first or forward portion or arm 1362 and of the third or rear portion or arm 1374, on the one hand, and the corresponding cavities 1315,1315B of the base 1342 may be a transition fit. Fasteners 1327,1329 extending through bores in the end portions 1348A,1348B may be received in threaded bores or a nut on the opposite side of the base shown in FIGS. 19A-19B, and need only prevent lateral dislodgement of the body 1348 from the base 1342.

As shown in FIG. 19A-19B, a fourteenth example suspension travel control formation 1446 reversibly secures a body 1442 to a base 1448 incorporating a top mounting pad

1420. The body 1448 is a link having a first end or a forward end 1448A and a second end or rearward end 1448B and includes therebetween a first or forward portion or arm 1462, a second or middle portion or arm 1468, and a third or rear portion or arm 1474, which together provide an interior surface defining an elongated interior space 1447 in which a stop post 834 is positioned during use. The first or forward portion or arm 1462 and the third or rear portion or arm 1474 are spaced apart and connect or transition into the second or middle portion or arm 1468 which is arcuate or C or U shaped. A point of inflection 1465 may be created near or adjacent the transition between the first or forward portion or arm 1462 and the second or middle portion or arm 1468.

The body and the base are reversibly secured together by fastening each end 1148A,1148B of the body 1148 between a corresponding outboard mounting tab 1442A,1442B and an inboard mounting tab 1442AA,1442BB. The bores of three structures (outboard mounting pad, an end of the body and inboard mounting pad) are placed in registration and receive a fastener 1427,1429. The double shear connection distributes load carried by a the portion or arm of the body 1448 through two mounting tabs positioned on opposite sides of the portion or arm of the body 1448, rather than through just a single mounting tab connection, provides for a stronger connection. Each of the examples herein that connect an end portion or arm of the body of the suspension travel control formation with either one or two mounting tabs, may be implemented using either double or single shear connections without departing from the scope of the present disclosure.

As shown in FIGS. 20A-20E, a fifteenth example suspension travel control formation 1546 includes a body 1548 in the form of a link that is an enclosed, flexible loop, and a base 1542 incorporating a top mounting pad 1520 having spaced apart first and second shoulders 1556,1580, each of which may define a U shaped groove 1523,1525 for receiving a U shaped fastener assembly that assists in coupling an associated main support member to an axle. A mounting tab or mounting bracket 1543 secured to the base 1542 presents a spool or a retaining post 1544. The flexible loop encircles both a stop post 834 secured to a vehicle frame and the spool 1544 secured to the base 1542 incorporating the top mounting pad 1520. A washer or a disc 1531 secured at the outboard edge of the stop post assists in limiting lateral displacement of the flexible loop from the stop post during use. A recess 1517 between the shoulders 1556,1580 of the top mounting pad 1520 provides a jounce pad. Longitudinal redundancy is provided by the intersection of the jounce pad with the first and second shoulders 1556,1580. The vertical height of shoulder may need to be raised to ensure that it catches the top post when the main support member and base rise and move longitudinally as a result of a failure or break in the main support member.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope of this disclosure is not limited to the above description but is as set forth in the following claims, and it is understood that claims may be directed to the features hereof, including as combinations of features that are individually disclosed or claimed herein.

The invention claimed is:

1. A suspension system for a vehicle having a vehicle frame, comprising,
   an axle;
   a suspension linkage, said suspension linkage being longitudinally disposed and for movable connection to the vehicle frame;
   a suspension travel control system comprising
      a stop post to be secured at one end to the vehicle frame and presenting at least one contact surface, and
      a suspension travel control formation comprising a body and a base, the body having an interior surface defining an elongated interior space, the body being a rigid structure that moves in relation to the stop post during operation of the suspension system,
      wherein each of the body and the base of the suspension travel control formation presents a first engagement surface positioned and arranged for contact with one another to assist in securing the body to the base,
   wherein the axle, the suspension linkage, and the suspension travel control formation are fixed in relation to one another and undergo generally vertical suspension travel movement relative to said stop post during operation of the suspension system, with the stop post in the interior space of the suspension travel control formation body, and
   wherein the stop post is positioned in the interior space for the engagement of the at least one contact surface of the stop post with the interior surface of the body to limit downward travel of the axle or the suspension linkage during operation of the suspension system.

2. The suspension system of claim 1 wherein the body and the base of the suspension travel control formation form a closed loop.

3. The suspension system of claim 1 wherein the suspension linkage includes a main support member, said main support member comprising a leaf spring.

4. The suspension system of claim 1 wherein the body of the suspension travel control formation is in the shape of an upside down U having a forward leg and a rear leg, the forward leg and the rear leg being of unequal length.

5. The suspension system of claim 1, wherein the body of the suspension travel control formation includes a first frame member, a second frame member and a third frame member providing the interior surface defining the interior space, wherein
   the first frame member, the second frame member and the third frame member each include a first longitudinal end portion and a second longitudinal end portion,
   the first frame member and the third frame member are spaced apart, each extending generally vertically from their respective first longitudinal end portions which connect with or transition from the base, and
   the respective second longitudinal end portions of the first frame member and the third frame member each connect with or transition from, respectively, the first and second longitudinal end portions of the second frame member, and the second frame member is positioned at the top of the interior space.

6. The suspension system of claim 5, wherein the first frame member, the second frame member and the third frame member being integrally formed together.

7. The suspension system of claim 5, the stop post having a contact surface positioned for engagement with the interior surface of the third frame member to limit movement of the axle or the suspension linkage in a forward direction generally perpendicular to a path defined by the movement of the stop post within the suspension travel control formation between a rebound and a jounce position, and/or the stop post having a contact surface positioned for engagement with the interior surface of the first frame member to limit movement of the axle or the suspension linkage in a rearward direction generally perpendicular to a path defined by the movement of the stop post within the suspension travel control formation between a rebound and a jounce position.

8. The suspension system of claim 5, wherein the first and third members of the suspension travel control formation each have a longitudinal axis, said longitudinal axes being generally parallel to one another, and/or wherein the first and third frame members of the suspension travel control formation are arcuate in shape.

9. The suspension system of claim 1 further comprising a flange mounted to the stop post, the suspension travel control formation disposed between the vehicle frame and the flange, the flange having an inboard facing contact surface positioned for engagement with the suspension travel control formation to limit outboard travel of the axle, the suspension linkage or the suspension travel control formation.

10. The suspension system of claim 1 wherein the suspension travel control formation resembles a fin.

11. The suspension system of claim 1, wherein the axle, the suspension linkage and the suspension travel control formation are coupled by an axle coupling assembly, the axle coupling assembly including a first mounting pad.

12. The suspension system of claim 1, wherein the suspension travel control formation is integrally formed with the first mounting pad.

13. The suspension system of claim 11, wherein the first mounting pad and the suspension travel control formation comprise discrete components.

14. The suspension system of claim 1 wherein the body of the suspension travel control formation comprises a link that is connected to and straddles the base of the suspension travel control formation.

15. The suspension system of claim 1, wherein the base of the suspension travel control formation incorporates a mounting pad for securing the axle to the suspension linkage with the use of fasteners.

16. The suspension system of claim 1, wherein each of the body and the base of the suspension travel control formation presents a second engagement surface positioned and arranged for contact with one another to assist in securing the body to the base.

17. The suspension system of claim 16, wherein each of the body and the base of the suspension travel control formation defines a first bore, the first bore of the body and the first bore of the base positioned in registration with one another and receiving a first fastener to assist in securing the body in fixed relation to the base.

18. The suspension system of claim 17, wherein each of the body and the base of the suspension travel control formation defines a second bore, the second bore of the body and the second bore of the base positioned in registration with one another and receiving a second fastener to assist in securing the body in fixed relation to the base.

19. The suspension system of claim 18, wherein the base of the suspension travel control formation comprises a first end and a second end positioned on opposite sides of the base, and a first mounting tab and a second mounting tab to assist in securing the body to the base, the first mounting tab providing the first bore and the first engagement surface of the base, the second mounting tab providing the second bore and the second engagement surface of the base.

20. The suspension system of claim 19, wherein the first mounting tab and the second mounting tab are positioned respectively between and spaced apart from the first end and the second end of the base.

21. The suspension system of claim 19 wherein the first mounting tab and the second mounting tab are positioned asymmetrically along the longitudinal axis of the base with respect to its first end and second end.

22. The suspension system of claim 16, wherein at least one of the respective first engagement surfaces of the body and the base or the respective second engagement surfaces of the body and the base interlock with one another and are secured together without an associated discrete fastener.

23. The suspension system of claim 1, wherein the base comprises a first shoulder and a second shoulder, said first shoulder and said second shoulder spaced apart by a recess extending therebetween, the recess having a top surface serving as a jounce pad that is brought into contact with the stop post to limit upward travel of the suspension system, and each of the first shoulder and the second shoulder forming an abutment limiting respectively rearward and forward movement of the axle during a failure or break of the suspension linkage or its connection with the vehicle frame.

24. The suspension system of claim 1, wherein the body of the suspension travel control formation comprises a link, and a forward arm of the link comprises a reinforcement member.

25. The suspension system of claim 1 wherein the base of the suspension travel control formation comprises a mounting element which presents the first engagement surface of the base, the mounting element comprising a hook for securing the body to the base.

26. A suspension travel control system for a suspension system of a vehicle, said suspension travel control system comprising, a stop post configured for securement at one end to a vehicle frame and presenting at least one contact surface, and a suspension travel control formation comprising a body and a base, the body having an interior surface defining an elongated interior space, the body being a rigid structure that moves in relation to the stop post during operation of the suspension system, wherein the suspension travel control formation is configured for fixed securement to an axle and a suspension linkage of the vehicle, the axle the suspension linkage and the suspension travel control formation further configured to undergo generally vertical suspension travel movement relative to said stop post during operation of the suspension system with the stop post positioned in the interior space of the suspension travel control formation body for the engagement of the at least one contact surface of the stop post with the interior surface of the body to limit downward travel of the axle or the suspension linkage during operation of the suspension system.

27. The suspension travel control system of claim 26 wherein the body and the base of the suspension travel control formation form a closed loop.

28. The suspension travel control system of claim 26 wherein the body and the base of the suspension travel control formation are integrally formed.

29. The suspension travel control system of claim 26 wherein each of the body and the base of the suspension travel control formation presents a first engagement surface positioned and arranged for contact with one another to assist in securing the body to the base.

30. The suspension travel control system of claim 29 wherein each of the body and the base of the suspension travel control formation presents a second engagement surface positioned and arranged for contact with one another to assist in securing the body to the base.

31. The suspension system of claim 29 wherein the base of the suspension travel control formation comprises a mounting element which presents the first engagement surface of the base, the mounting element comprising a hook for securing the body to the base.

32. The suspension system of claim 29 wherein the first engagement surface of each of the body and the base are secured together with the use of a fastener.

* * * * *